United States Patent
Oh et al.

(10) Patent No.: US 10,587,852 B2
(45) Date of Patent: Mar. 10, 2020

(54) BROADCAST SIGNAL TRANSMISSION DEVICE, BROADCAST SIGNAL RECEPTION DEVICE, BROADCAST SIGNAL TRANSMISSION METHOD, AND BROADCAST SIGNAL RECEPTION METHOD

(71) Applicant: LG ELECTRONICS INC., Seoul (KR)

(72) Inventors: Hyunmook Oh, Seoul (KR); Jongyeul Suh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/759,798

(22) PCT Filed: Oct. 6, 2016

(86) PCT No.: PCT/KR2016/011202
§ 371 (c)(1),
(2) Date: Mar. 13, 2018

(87) PCT Pub. No.: WO2017/061796
PCT Pub. Date: Apr. 13, 2017

(65) Prior Publication Data
US 2018/0262731 A1    Sep. 13, 2018

Related U.S. Application Data

(60) Provisional application No. 62/238,097, filed on Oct. 6, 2015, provisional application No. 62/238,721, filed on Oct. 8, 2015.

(51) Int. Cl.
*G06F 13/14* (2006.01)
*H04N 9/64* (2006.01)
(Continued)

(52) U.S. Cl.
CPC ............... *H04N 9/646* (2013.01); *H04N 9/64* (2013.01); *H04N 9/641* (2013.01);
(Continued)

(58) Field of Classification Search
CPC ........................................................ G06F 13/14
See application file for complete search history.

(56) References Cited

U.S. PATENT DOCUMENTS 8,253,859 B2 * 8/2012 Suzuki .................. G09G 5/003
                                                                         341/50
8,704,955 B2 * 4/2014 Ichimura ................ G09G 5/006
                                                                         348/705
(Continued)

FOREIGN PATENT DOCUMENTS

WO    2014130343 A2    8/2014
WO    2015076608 A1    5/2015

OTHER PUBLICATIONS

Cea, Cea-861-D, Consumer Electronic Association, 2006, pp. 1-176,.*

*Primary Examiner* — Cheng Yuan Tseng
(74) *Attorney, Agent, or Firm* — Dentons US LLP

(57) ABSTRACT

The present invention proposes a method for transmitting a broadcast signal. The method for transmitting the broadcast signal according to the present invention proposes a system capable of supporting a next-generation broadcast service in the environment for supporting a next-generation hybrid broadcast using a terrestrial broadcast network and an internet network. In addition, proposed is an efficient signaling method capable of covering both the terrestrial broadcast network and the internet network in the environment for supporting the next-generation hybrid broadcast.

16 Claims, 38 Drawing Sheets

(51) Int. Cl.
*H04N 21/436* (2011.01)
*H04N 21/4402* (2011.01)
*H04N 21/4363* (2011.01)
*H04N 21/45* (2011.01)
*H04N 21/434* (2011.01)

(52) U.S. Cl.
CPC ....... *H04N 21/436* (2013.01); *H04N 21/4345* (2013.01); *H04N 21/43635* (2013.01); *H04N 21/4402* (2013.01); *H04N 21/440218* (2013.01); *H04N 21/4516* (2013.01); *G06T 2207/10016* (2013.01); *G06T 2207/10024* (2013.01)

(56) References Cited

U.S. PATENT DOCUMENTS

| | | | | |
|---|---|---|---|---|
| 9,055,281 B2 * | 6/2015 | Park | .................... | H04N 13/194 |
| 9,292,940 B2 * | 3/2016 | Newton | ............... | H04N 19/597 |
| 9,462,246 B2 * | 10/2016 | Nakajima | ......... | H04N 21/43635 |
| 9,591,257 B2 * | 3/2017 | Oh | ........................ | H04N 7/0117 |
| 9,661,294 B2 * | 5/2017 | Oh | ........................ | H04N 9/8722 |
| 9,774,819 B2 * | 9/2017 | Yamamoto | ............. | H04N 19/70 |
| 9,779,687 B2 * | 10/2017 | Park | ....................... | G09G 5/006 |
| 9,819,995 B2 * | 11/2017 | Park | .................. | H04N 21/43635 |
| 9,936,236 B2 * | 4/2018 | Oh | ...................... | H04N 21/2343 |
| 10,085,058 B2 * | 9/2018 | Lee | ....................... | H04N 21/436 |
| 10,097,822 B2 * | 10/2018 | Newton | ................. | G09G 5/006 |
| 10,162,769 B2 * | 12/2018 | Yang | ..................... | G06F 13/102 |
| 10,306,306 B2 * | 5/2019 | Nakajima | ................ | G09G 5/00 |
| 2010/0157154 A1 * | 6/2010 | Kobayashi | ............... | G09G 5/02 |
| | | | | 348/557 |
| 2014/0079113 A1 | 3/2014 | Newton et al. | | |
| 2014/0369662 A1 | 12/2014 | Hayashi et al. | | |
| 2016/0065923 A1 * | 3/2016 | Arai | ......................... | H04N 9/67 |
| | | | | 345/590 |
| 2017/0244927 A1 * | 8/2017 | Kim | ......................... | H04N 5/765 |
| 2018/0262731 A1 * | 9/2018 | Oh | ........................... | H04N 9/641 |

\* cited by examiner

FIG. 3

| Syntax | No. of Bits | Format |
|---|---|---|
| LLS_table() { | | |
|   LLS_table_id | 8 | uimsbf |
|   provider_id | 8 | uimsbf |
|   LLS_table_version | 8 | uimsbf |
|   switch (LLS_table_id) { | | |
|     case 0x01: | | |
|       SLT | var | Sec. 6.3 |
|       break; | | |
|     case 0x02: | | |
|       RRT | var | See Annex F |
|       break; | | |
|     case 0x03: | | |
|       System Time | var | Sec. 6.4 |
|       break; | | |
|     case 0x04: | | |
|       CAP | var | Sec. 6.5 |
|       break; | | |
|     default: | | |
|       reserved | var | |
|   } | | |
| } | | | t3010

| Element or Attribute Name | Use | Data Type |
|---|---|---|
| SLT | | |
|   @bsid | 1 | unsignedShort |
|   @sltCapabilities | 0..1 | string |
|   sltInetUrl | 0..1 | anyURL |
|     @urlType | 1 | unsignedByte |
|   Service | 1..N | |
|     @serviceID | 1 | unsignedShort |
|     @sltSvcSeqNum | 1 | unsignedByte |
|     @protected | 0..1 | boolean |
|     @majorChannelNo | 0..1 | 1...999 |
|     @minorChannelNo | 0..1 | 1...999 |
|     @serviceCategory | 1 | unsignedByte |
|     @shortServiceName | 0..1 | string |
|     @hidden | 0..1 | boolean |
|     @broadbandAccessRequired | 0..1 | boolean |
|     @svcCapabilities | 0..1 | string |
|     BroadcastSvcCignaling | 0..1 | |
|       @slsProtocol | 1 | unsignedByte |
|       @slsMajorProtocolVersion | 1 | unsignedByte |
|       @slsMinorProtocolVersion | 1 | unsignedByte |
|       @slsPlpID | 0..1 | unsignedByte |
|       @slsDestinationIpAddress | 1 | string |
|       @slsDestinationUdpPort | 1 | unsignedShort |
|       @slsSourceIpAddress | 1 | string |
|     svcInetUrl | 0..N | anyURL |
|       @urlType | 1 | unsignedByte | t3020

FIG. 4

| Element or Attribute Name | | | | Use | Data Type |
|---|---|---|---|---|---|
| bundleDescription | | | | | |
|   userServiceDescription | | | | | |
| | @globalServiceID | | | 1 | anyURL |
| | @serviceID | | | 1 | unsignedShort |
| | @serviceStatus | | | 0..1 | boolean |
| | @fullMPDUri | | | 1 | anyURL |
| | @sTSIDUri | | | 1 | anyURL |
| | name | | | 0..N | string |
| | | @lang | | 1 | language |
| | serviceLanguage | | | 0..N | language |
| | capabilityCode | | | 0..1 | string |
| | deliveryMethod | | | 1..N | |
| | | broadcastAppService | | 1..N | |
| | | | basePattern | 1..N | string |
| | | unicastAppService | | 0..N | |
| | | | basePattern | 1..N | string |

— t4010

| Element or Attribute Name | | Use | Data Type |
|---|---|---|---|
| S-TSID | | | |
|   @serviceID | | 1 | unsignedShort |
|   RS | | 1..N | |
| | @bsid | 0..1 | unsignedShort |
| | @sIpAddr | 0..1 | string |
| | @dIpAddr | 0..1 | string |
| | @dport | 0..1 | unsignedShort |
| | @PLPID | 0..1 | unsignedByte |
| | LS | 1..N | |
| |   @tsi | 1 | unsignedInt |
| |   @PLPID | 0..1 | unsignedByte |
| |   @bw | 0..1 | unsignedInt |
| |   @startTime | 0..1 | dateTime |
| |   @endTime | 0..1 | dateTime |
| |   SrcFlow | 0..1 | scrFlowType |
| |   RepairFlow | 0..1 | rprFlowType | t4020

FIG. 5

| Element or Attribute Name | Use |
|---|---|
| bundleDescription | |
|   userServiceDescription | |
|     @globalServiceID | M |
|     @serviceID | M |
|     Name | 0..N |
|       @lang | CM |
|     serviceLanguage | 0..N |
|     contentAdvisoryRating | 0..1 |
|     Channel | 1 |
|       @serviceGenre | 0..1 |
|       @serviceIcon | 1 |
|       ServiceDescription | 0..N |
|         @serviceDescrText | 1 |
|         @serviceDescrLang | 0..1 |
|     mpuComponent | 0..1 |
|       @mmtPackageId | 1 |
|       @nextMmtPackageId | 0..1 |
|     routeComponent | 0..1 |
|       @sTSIDUri | 1 |
|       @sTSIDDestinationIpAddress | 0..1 |
|       @sTSIDDestinationUdpPort | 1 |
|       @sTSIDSourceIpAddress | 1 |
|       @sTSIDMajorProtocolVersion | 0..1 |
|       @sTSIDMinorProtocolVersion | 0..1 |
|     broadbandComponent | 0..1 |
|       @fullMPDUri | 1 |
|     ComponentInfo | 1..N |
|       @ComponentType | 1 |
|       @ComponentRole | 1 |
|       @ComponentProtectedFlag | 0..1 |
|       @ComponentId | 1 |
|       @ComponentName | 0..1 |

FIG. 6
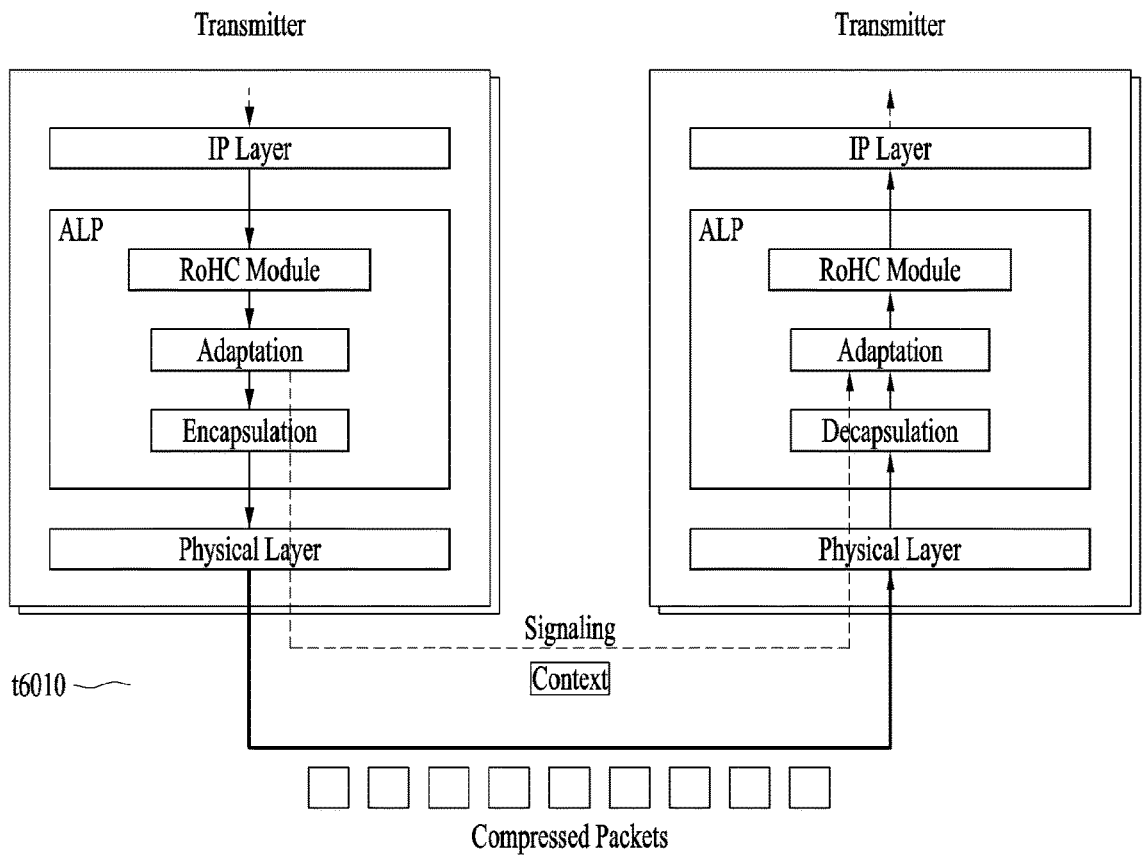
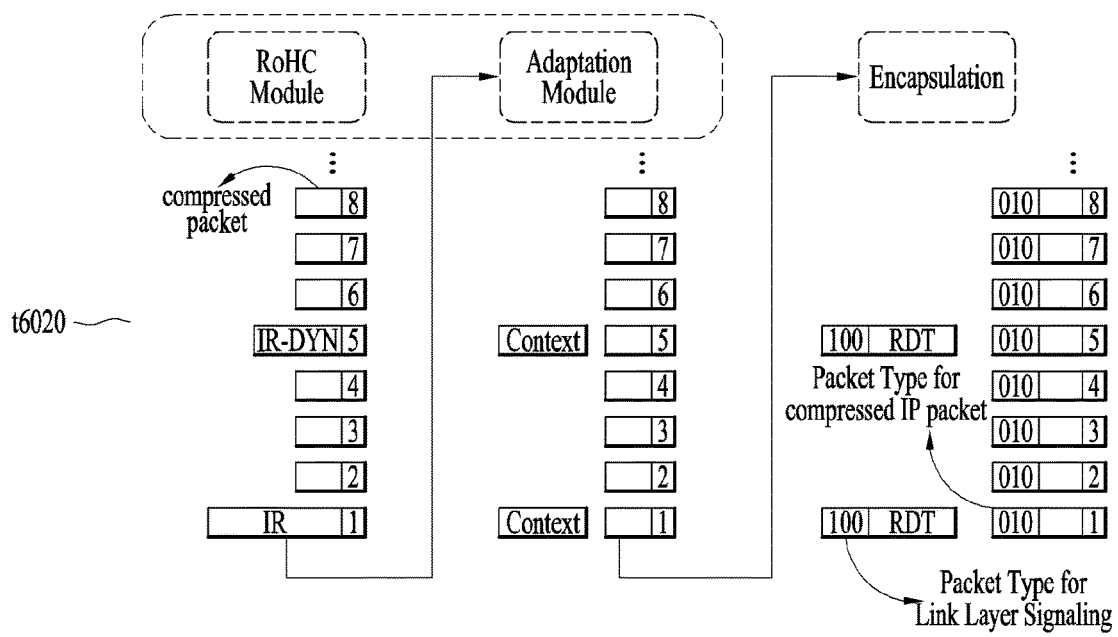

FIG. 7

| Syntax | Number of bits | Format |
|---|---|---|
| Link_Mapping_Table() { | | |
|     signaling_type | 8 | 0x01 |
|     PLP_ID | 6 | uimsbf |
|     reserved | 2 | "11" |
|     num_session | 8 | uimsbf |
|     for(i = 0 ; i < num_session ; i++) { | | |
|         src_IP_add | 32 | uimsbf |
|         dst_IP_add | 32 | uimsbf |
|         src_UDP_port | 16 | uimsbf |
|         dst_UDP_port | 16 | uimsbf |
|         SID_flag | 1 | bslbf |
|         compressed_flag | 1 | bslbf |
|         reserved | 6 | '111111' |
|         if (SID_flag == "1") { | | |
|             SID | 8 | uimsbf |
|         } | | |
|         if (compressed_flag == "1') { | | |
|             context_id | 8 | uimsbf |
|         } | | |
|     } | | |
| } | | |

FIG. 10

| Offset | Value | | | | | | | | Description/Format |
|---|---|---|---|---|---|---|---|---|---|
| 0x00 | 0x14 | | | | | | | | HDR Data Block |
| 0x01 | 7 | 6 | 5 | 4 | 3 | 2 | 1 | 0 | BLOCK Revision and Other Data |
|  | _ | _ | _ | _ | 0 | 0 | 0 |  | REVISION 0 |
|  | 0 | 0 | 0 | 0 | 0 | _ | _ | _ | RESERVED(BLOCK SPECIFIC) |
| 0x02 | | | | | | | | | Number Of Payload Bytes |
| 0x03 | Descriptor | | | | | | | | Control option flag |
| 0x04 0x05 | Descriptor | | | | | | | | Sink Device Dynamic Range |

FIG. 11

| Offset | Value | | | | | | | | Description/Format |
|---|---|---|---|---|---|---|---|---|---|
| 0x03 | 7 | 6 | 5 | 4 | 3 | 2 | 1 | 0 | Control Option Flag |
| | 1 | _ | _ | _ | _ | _ | _ | _ | Activate HDR processing in source device |
| | _ | 1 | _ | _ | _ | _ | _ | _ | Activate WCG processing in source device |
| | _ | _ | reserved | | | | | | Reserved |

FIG. 12

| Control option flag | description | Detailed description |
|---|---|---|
| 00000000 | No change | Source device does not perform any processing |
| 10000000 | Source device (HDR) | Source device performs only HDR |
| 01000000 | Source device (WCG) | Source device performs only WCG |
| 11000000 | Source device | Sink device performs all processing based on delivered information (initial value) |

FIG. 13

| Offset | Value | | | | | | | | Description/Format |
|---|---|---|---|---|---|---|---|---|---|
|  | 7 | 6 | 5 | 4 | 3 | 2 | 1 | 0 | Sink Device Dynamic Range |
| 0x04 | 0x00 -> 0xFF | | | | | | | | Lowest Brightness level of Sink device (higher 8 bits) |
| 0x05 | 1 | _ | _ | _ | _ | _ | _ |  | Lowest Brightness level of Sink device (LSB) |
|  | _ | 0x00 -> 0x3F | | | | | | | Highest Brightness level of Sink device (total 7 bits) |

FIG. 14

| Offset | Value | Description/Format | |
|---|---|---|---|
| 00$_h$ | 00$_h$ | DISPLAY PARAMETERS DATA BLOCK | TAG |
| 01$_h$ | 7 6 5 4 3 2 1 0 | BLOCK Revision and Other Data | |
| | _ _ _ _ _ 0 0 0 | REVISION '0' | VALUES 0 → 7 |
| | 0 0 0 0 0 _ _ _ | RESERVED | |
| 02$_h$ | 0C$_h$ | Number of Payload Bytes in BLOCK | 12 |
| 03$_h$ 04$_h$ | DESCRIPTOR | Horizontal image size | |
| 05$_h$ 06$_h$ | DESCRIPTOR | Vertical image size | |
| 07$_h$ 08$_h$ | DESCRIPTOR | Horizontal pixel count | |
| 09$_h$ 0A$_h$ | DESCRIPTOR | Vertical pixel count | |
| 0B$_h$ | DESCRIPTOR | Feature Support Flags | |
| 0C$_h$ | DESCRIPTOR | Transfer Characteristic Gamma | |
| 0D$_h$ | DESCRIPTOR | Aspect Ratio | |
| 0E$_h$ | DESCRIPTOR | Color Bit Depth | |

| Offset | Value | Description/Format |
|---|---|---|
| 0x0F | 7 6 5 4 3 2 1 0 | Control Option Flag |
| | 1 _ _ _ _ _ _ _ | Activate HDR processing in source device |
| | _ 1 _ _ _ _ _ _ | Activate WCG processing in source device |
| | _ _ reserved _ _ | Reserved |
| | 7 6 5 4 3 2 1 0 | Sink Device Dynamic Range |
| 0x10 | 0x00 -> 0xFF | Lowest Brightness level of Sink device (higher 8 bits) |
| 0x11 | 1 _ _ _ _ _ _ _ | Lowest Brightness level of Sink device (LSB) |
| | _ 0x00 -> 0x3F | Highest Brightness level of Sink device (total 7 bits) |

FIG. 15

| Offset | Value | Description/Format |
|---|---|---|
| 00h | 0Ch | DISPLAY DEVICE DATA BLOCK TAG |
| 01h | 7 \| 6 \| 5 \| 4 \| 3 \| 2 \| 1 \| 0 | BLOCK Revision and Other Data |
|  | _ \| _ \| _ \| _ \| 0 \| 0 \| 0 | REVISION '0'                                VALUES 0 → 7 |
|  | 0 \| 0 \| 0 \| 0 \| 0 \| _ \| _ \| _ | RESERVED |
| 02h | 0Dh | Number of Payload Bytes in BLOCK                      13 |
| 03h | DESCRIPTOR | Display Device Technology |
| 04h | DESCRIPTOR | Device operating mode |
| 05h→08h | DESCRIPTOR | Devoce native pixel format |
| 09h→0Ah | DESCRIPTOR | Aspect ratio and orientation |
| 0Bh | DESCRIPTOR | Sub-pixel layout / configuration / shape |
| 0Ch→0Dh | DESCRIPTOR | Horizontal and vertical dot / pixel pitch |
| 0Eh | DESCRIPTOR | Color bit depth |
| 0Fh | DESCRIPTOR | Response time |

| Offset | Value | Description/Format |
|---|---|---|
| 0x0F | 7 \| 6 \| 5 \| 4 \| 3 \| 2 \| 1 \| 0 | Control Option Flag |
|  | 1 \| _ \| _ \| _ \| _ \| _ \| _ | Activate HDR processing in source device |
|  | _ \| 1 \| _ \| _ \| _ \| _ \| _ | Activate WCG processing in source device |
|  | reserved | Reserved |
|  | 7 \| 6 \| 5 \| 4 \| 3 \| 2 \| 1 \| 0 | Sink Device Dynamic Range |
| 0x10 | 0x00 -> 0xFF | Lowest Brightness level of Sink device (higher 8 bits) |
| 0x11 | 1 \| _ \| _ \| _ \| _ \| _ \| _ | Lowest Brightness level of Sink device (LSB) |
|  | _ \| 0x00 -> 0x3F | Highest Brightness level of Sink device (total 7 bits) |

FIG. 16

| | Byte# | Bits 5-7 | Bits 0-4 |
|---|---|---|---|
| Video Data Block | 1 | Video Tag Code | length = total number of video bytes following this byte ($L_1$) |
| | 2 | CEA Short Video Descriptor 1 | |
| | 3 | CEA Short Video Descriptor 2 | |
| | ... | ... | |
| | $1+L_1$ | CEA Short Video Descriptor $L_1$ | |
| Audio Data Block | $2+L_1$ | Audio Tag Code | length = total number of audio bytes following this byte ($L_2$) |
| | $3+L_1$ | CEA Short Audio Descriptor 1 | |
| | $4+L_1$ | | |
| | $5+L_1$ | | |
| | ... | | |
| | ... | | |
| | $L_1+L_2$ | CEA Short Audio Descriptor $L_2$ / 3 | |
| | $1+L_1+L_2$ | | |
| | $2+L_1+L_2$ | | |
| Speaker Allocation Data Block | $3+L_1+L_2$ | Speaker Allocation Tag Code | length = total number of Speaker Allocation bytes following this byte ($L_3=3$) |
| | $4+L_1+L_2$ | Speaker Allocation Data Block Payload (3 bytes) | |
| | $5+L_1+L_2$ | | |
| | $6+L_1+L_2$ | | |
| Vendor-Specific Data Block | $7+L_1+L_2$ | Vendor-Specific Tag Code | length = total number of Vendor-Specific bytes following this byte ($L_4$) |
| | $8+L_1+L_2$ | IEEE OUI third two hex digits | |
| | $9+L_1+L_2$ | IEEE OUI second two hex digits | |
| | $10+L_1+L_2$ | IEEE OUI first two hex digits | |
| | ... | Vendor-Specific Data Block Payload ($L_4$-3 bytes) | |
| | ... | | |
| Video Capability Data Block | $8+L_1+L_2+L_4$ | Extended Tag Code | length = total number of bytes in this block following this byte ($L_5$) |
| | $9+L_1+L_2+L_4$ | Video Capabilities Ext. Tag Code = 00h | |
| | $10+L_1+L_2+L_4$ | Video Capabilities Data Bye 3 (see Section 7.5.6) | |
| Dynamic Range | $11+L_1+L_2+L_4+L_5$ | Dynamic range Tag Code | length = total number of bytes in this block following this byte ($L_6=3$) |
| | $12+L_1+L_2+L_4+L_5$ | Lowest Brightness level of Sink device (higher 8 bits) | |
| | $13+L_1+L_2+L_4+L_5$ | Lowest Brightness level of Sink device (LSB) | |
| | $14+L_1+L_2+L_4+L_5$ | Highest Brightness level of Sink device (total 7 bits) | |

FIG. 17

| InfoFrame Type Code | InfoFrame Type = 0x07 (UHDInfoFrame) | | | | | | | |
|---|---|---|---|---|---|---|---|---|
| InfoFrame Version Number | Version= 0x00 | | | | | | | |
| Length of HDRInfoFrame | Length of HDRInfoFrame () | | | | | | | |
| Data Byte 1 | P3 | P2 | P1 | P0 | R2 | R1 | R0 | E0 |
| Data Byte 2 | black_luminance_level (highest 8 bits) | | | | | | | |
| Data Byte 3 | black_luminance level (lower 1 bit) | white_luminance_level (7 bits) | | | | | | |
| Data Byte 4 | Orig_black_luminance_level (highest 8 bits) | | | | | | | |
| Data Byte 5 | Orig_black_luminance_level (lower 1 bit) | Orig_white_luminance_level (7 bits) | | | | | | |
| Data Byte 6 | Orig_color_gamut | | S3 | S2 | S1 | S0 | | |
| Data Byte 7 | Red-x low bits | Red-y low bits | Green-x low bits | Green-y low bits | | | | |
| Data Byte 8 | Blue-x low bits | Blue-x low bits | White-x low bits | White-y low bits | | | | |
| Data Byte 9 | Red-x high bits | | | | | | | |
| Data Byte 10 | Red-y high bits | | | | | | | |
| Data Byte 11 | Green-x high bits | | | | | | | |
| Data Byte 12 | Green-y high bits | | | | | | | |
| Data Byte 13 | Blue-x high bits | | | | | | | |
| Data Byte 14 | Blue-y high bits | | | | | | | |
| Data Byte 15 | White-x high bits | | | | | | | |
| Data Byte 16 | White-y high bits | | | | | | | |
| Data Byte 17 | E3 | E2 | E1 | E0 | Number of Coefficients | | | |
| Data Byte 18 | EOTF_additional_info | | | | | | | |
| Data Byte (18+1) | EOTF_Coefficient 1 | | | | | | | |
| Data Byte (18+2) | EOTF_Coefficient 2 | | | | | | | |
| ... | ... | | | | | | | |
| Data Byte (18+N) | EOTF_Coefficient N | | | | | | | |

FIG. 18

| post_processing_type | description | Detailed description |
|---|---|---|
| 0000 | No change | Source device does not perform any processing |
| 0001 | Dynamic Range mapping | Dynamic range mapping is performed |
| 0010 | Gamut mapping | Gamut mapping is performed |
| 0011 | Source device | Source device performs all processing based on information delivered by sink device |
| 0011-1000 | reserved | These may be used for information exchange between sink and source devices in the future, for frc and multilayer video enhancement function |
| 1001-1111 | User private | |
| 1111 | Different contents gamut | Original color gamut is used to distinguishably signal contents color gamut and container color gamut |

FIG. 19

| Orig_color_gamut | description |
|---|---|
| 0000 | REC. 709 |
| 0001 | BT. 2020 NCL |
| 0010 | xvYCC |
| 0011 | DCI-P3 |
| 0100 | Adobe RGB |
| 0101 | BT. 2020 CL |
| 0110 ~ 1111 | reserved |

FIG. 20

| InfoFrame Type Code | InfoFrame Type = 0×02 | | | | | | | |
|---|---|---|---|---|---|---|---|---|
| InfoFrame Version Number | Version = 0×02 or [0×03] | | | | | | | |
| Length of AVI InfoFrame | Length of AVI InfoFrame (16) | | | | | | | |
| Data Byte 1 | [Y2] | Y1 | Y0 | A0 | B1 | B0 | S1 | S0 |
| Data Byte 2 | C1 | C0 | M1 | M0 | R3 | R2 | R1 | R0 |
| Data Byte 3 | ITC | EC2 | EC1 | EC0 | Q1 | Q0 | SC1 | SC0 |
| Data Byte 4 | [VIC7] | VIC6 | VIC5 | VIC4 | VIC3 | VIC2 | VIC1 | VIC0 |
| Data Byte 5 | VQ1 | VQ2 | CN1 | CN0 | PR3 | PR2 | PR1 | PR0 |
| Data Byte 6 | ETB07-ETB00 (Line Number of End of Top Bar - lower 8 bits) | | | | | | | |
| Data Byte 7 | ETB15-ETB08 (Line Number of End of Top Bar - upper 8 bits) | | | | | | | |
| Data Byte 8 | SBB07-SBB00 (Line Number of Start of Bottom Bar - lower 8 bits) | | | | | | | |
| Data Byte 9 | SBB15-SBB08 (Line Number of Start of Bottom Bar - upper 8 bits) | | | | | | | |
| Data Byte 10 | ELB07-ELB00 (Pixel Number of End of Left Bar - lower 8 bits) | | | | | | | |
| Data Byte 11 | ELB15-ELB08 (Pixel Number of End of Left Bar - upper 8 bits) | | | | | | | |
| Data Byte 12 | SRB07-SBB00 (Pixel Number of Start of Right Bar - lower 8 bits) | | | | | | | |
| Data Byte 13 | SRB15-SBB08 (Pixel Number of Start of Right Bar - upper 8 bits) | | | | | | | |
| Data Byte 14 | P3 | P2 | P1 | P0 | R2 | R1 | R0 | E0 |
| Data Byte 15 | black_luminance_level (highest 8 bits) | | | | | | | |
| Data Byte 16 | black_luminance_level(lower 1 bit) | white_luminance_level (7 bits) | | | | | | |
| Data Byte 17 | Orig_black_luminance_level (highest 8 bits) | | | | | | | |
| Data Byte 18 | Orig_black_luminance_level( lower1 bit) | Orig_white_luminance_level (7 bits) | | | | | | |
| Data Byte 19 | Orig_color_gamut | | | | S3 | S2 | S1 | S0 |
| Data Byte 20 | Red-x low bits | | Red-y low bits | | Green-x low bits | | Green-y low bits | |
| Data Byte 21 | Blue-x low bits | | Blue-y low bits | | White-x low bits | | White-y low bits | |
| Data Byte 22 | Red-x high bits | | | | | | | |
| Data Byte 23 | Red-y high bits | | | | | | | |
| Data Byte 24 | Green-x high bits | | | | | | | |
| Data Byte 25 | Green-y high bits | | | | | | | |
| Data Byte 26 | Blue-x high bits | | | | | | | |
| Data Byte 27 | Blue-y high bits | | | | | | | |
| Data Byte 28 | White-x high bits | | | | | | | |
| Data Byte 29 | White-y high bits | | | | | | | |
| Data Byte 30 | E3 | E2 | E1 | E0 | Number of Coefficients | | | |
| Data Byte 31 | EOTF_additional_info | | | | | | | |
| Data Byte (31+1) | EOTF_Coefficient 1 | | | | | | | |
| Data Byte (31+2) | EOTF_Coefficient 2 | | | | | | | |
| ... | ... | | | | | | | |
| Data Byte (31+N) | EOTF_Coefficient N | | | | | | | |

FIG. 22

| EOTF type | description |
|---|---|
| 000 | Reserved |
| 001 | EOTF_type1 |
| 010 | EOTF_type2 |
| 011-111 | User Private |

FIG. 23

| InfoFrame Type Code | InfoFrame Type = 0×02 | | | | | | | |
|---|---|---|---|---|---|---|---|---|
| InfoFrame Version Number | Version = 0×02 or [0×03] | | | | | | | |
| Length of AVI InfoFrame | Length of AVI InfoFrame (13) | | | | | | | |
| Data Byte 1 | [Y2] | Y1 | Y0 | A0 | B1 | B0 | S1 | S0 |
| Data Byte 2 | C1 | C0 | M1 | M0 | R3 | R2 | R1 | R0 |
| Data Byte 3 | ITC | EC2 | EC1 | EC0 | Q1 | Q0 | SC1 | SC0 |
| Data Byte 4 | [VIC7] | VIC6 | VIC5 | VIC4 | VIC3 | VIC2 | VIC1 | VIC0 |
| Data Byte 5 | VQ1 | VQ2 | CN1 | CN0 | PR3 | PR2 | PR1 | PR0 |
| Data Byte 6 | ETB07-ETB00 (Line Number of End of Top Bar - lower 8 bits) | | | | | | | |
| Data Byte 7 | ETB15-ETB08 (Line Number of End of Top Bar - upper 8 bits) | | | | | | | |
| Data Byte 8 | SBB07-SBB00 (Line Number of Start of Bottom Bar - lower 8 bits) | | | | | | | |
| Data Byte 9 | SBB15-SBB08 (Line Number of Start of Bottom Bar - upper 8 bits) | | | | | | | |
| Data Byte 10 | ELB07-ELB00 (Pixel Number of End of Left Bar - lower 8 bits) | | | | | | | |
| Data Byte 11 | ELB15-ELB08 (Pixel Number of End of Left Bar - upper 8 bits) | | | | | | | |
| Data Byte 12 | SRB07-SBB00 (Pixel Number of Start of Right Bar - lower 8 bits) | | | | | | | |
| Data Byte 13 | SRB15-SBB08 (Pixel Number of Start of Right Bar - upper 8 bits) | | | | | | | |

17010

| C1 | C0 | Colorimatry |
|---|---|---|
| 0 | 0 | No Data |
| 0 | 1 | SMPTE 179M [1] |
| 1 | 0 | ITU-R BT_709[7] |
| 1 | 1 | SMPTE 179M Extended Colorimetry Information Valid (colorimetry indicated in bits EC0, EC1, and EC2. See Table 12) |

17020

| EC2 | EC1 | EC0 | Extended Colorimatry |
|---|---|---|---|
| 0 | 0 | 0 | xvYCC$_{601}$ |
| 0 | 0 | 1 | xvYCC$_{709}$ |
| 0 | 1 | 0 | sYCC$_{601}$ |
| 0 | 1 | 1 | Adobe$_{YCC601}$ |
| 1 | 0 | 0 | Adobe$_{RGB}$ |
| 1 | 0 | 1 | ITU-R BT.2020 Y'$_C$ C'$_{BC}$ C'$_{RC}$ |
| 1 | 1 | 0 | ITU-R BT.2020 R'G'B' or Y'C'$_B$C'$_R$ |
| 1 | 1 | 1 | Reserved |

17030

| EC2 | EC1 | EC0 | Extended Colorimetry |
|---|---|---|---|
| 1 | 1 | 1 | DCI-P3 |

17040

| EC2 | EC1 | EC0 | Extended Colorimetry |
|---|---|---|---|
| 1 | 1 | 1 | Colorimetry Extension Valid |

17050

| Data Byte 19 | Orig_color_gamut | CE2 | CE1 | CE0 | S0 |
|---|---|---|---|---|---|
| ... | ... | | | | |

17060

| EC2 | EC1 | EC0 | Colorimetry Extension |
|---|---|---|---|
| 0 | 0 | 0 | Unspecified colorimetry |
| 0 | 0 | 1 | DCI-P3 |

| InfoFrame Type Code | InfoFrame Type = 0×02 | | | | | | | |
|---|---|---|---|---|---|---|---|---|
| InfoFrame Version Number | Version = 0×02 or [0×03] | | | | | | | |
| Length of AVI InfoFrame | Length of AVI InfoFrame (13) | | | | | | | |
| Data Byte 1 | [Y2] | Y1 | Y0 | A0 | B1 | B0 | S1 | S0 |
| Data Byte 2 | C1 | C0 | M1 | M0 | R3 | R2 | R1 | R0 |
| Data Byte 3 | ITC | EC2 | EC1 | EC0 | Q1 | Q0 | SC1 | SC0 |
| Data Byte 4 | [VIC7] | VIC6 | VIC5 | VIC4 | VIC3 | VIC2 | VIC1 | VIC0 |
| Data Byte 5 | VQ1 | VQ2 | CN1 | CN0 | PR3 | PR2 | PR1 | PR0 |
| Data Byte 6 | ETB07-ETB00 (Line Number of End of Top Bar - lower 8 bits) | | | | | | | |
| Data Byte 7 | ETB15-ETB08 (Line Number of End of Top Bar - upper 8 bits) | | | | | | | |
| Data Byte 8 | SBB07-SBB00 (Line Number of Start of Bottom Bar - lower 8 bits) | | | | | | | |
| Data Byte 9 | SBB15-SBB08 (Line Number of Start of Bottom Bar - upper 8 bits) | | | | | | | |
| Data Byte 10 | ELB07-ELB00 (Pixel Number of End of Left Bar - lower 8 bits) | | | | | | | |
| Data Byte 11 | ELB15-ELB08 (Pixel Number of End of Left Bar - upper 8 bits) | | | | | | | |
| Data Byte 12 | SRB07-SBB00 (Pixel Number of Start of Right Bar - lower 8 bits) | | | | | | | |
| Data Byte 13 | SRB15-SBB08 (Pixel Number of Start of Right Bar - upper 8 bits) | | | | | | | |
| Data Byte 14 |  |  |  |  |  | CE2 | CE1 | CE0 |

| C1 | C0 | Colorimatry |
|---|---|---|
| 0 | 0 | No Data |
| 0 | 1 | SMPTE 179M [1] |
| 1 | 0 | ITU-R BT_709[7] |
| 1 | 1 | SMPTE 179M Extended Colorimetry Information Valid (colorimetry indicated in bits EC0, EC1, and EC2. See Table 12) |

| EC2 | EC1 | EC0 | Extended Colorimatry |
|---|---|---|---|
| 0 | 0 | 0 | xvYCC$_{601}$ |
| 0 | 0 | 1 | xvYCC$_{709}$ |
| 0 | 1 | 0 | sYCC$_{601}$ |
| 0 | 1 | 1 | Adobe$_{YCC601}$ |
| 1 | 0 | 0 | Adobe$_{RGB}$ |
| 1 | 0 | 1 | ITU-R BT.2020 Y'$_C$ C''$_{BC}$ C''$_{RC}$ |
| 1 | 1 | 0 | ITU-R BT.2020 R'G'B' or Y'C'$_B$C'$_R$ |
| 1 | 1 | 1 | Reserved |

| EC2 | EC1 | EC0 | Colorimetry Extension |
|---|---|---|---|
| 0 | 0 | 0 | Unspecified colorimetry |
| 0 | 0 | 1 | DCI-P3 |

| EC2 | EC1 | EC0 | Extended Colorimetry |
|---|---|---|---|
| 1 | 1 | 1 | Colorimetry Extension Valid |

FIG. 26

| Offset | Value | | | | | | | | Description/Format |
|---|---|---|---|---|---|---|---|---|---|
| 0x00 | 0x14 | | | | | | | | HDR Data Block |
| 0x01 | 7 | 6 | 5 | 4 | 3 | 2 | 1 | 0 | BLOCK Revision and Other Data |
|  | _ | _ | _ | _ | _ | 0 | 0 | 0 | REVISION '0' |
|  | 0 | 0 | 0 | 0 | 0 | _ | _ | _ | RESERVED (BLOCK SPECIFIC) |
| 0x02 | | | | | | | | | Number Of Payload Bytes |
| 0x03 | Descriptor | | | | | | | | Control option flag |
| 0x04 0x05 | Descriptor | | | | | | | | Sink Device Dynamic Range |
| 0x06 | Descriptor | | | | | | | | Transfer Function Type flag |
| 0x07 ~ 0x0A | Descriptor | | | | | | | | Unspecified TF details |
| 0x0B~ | Descriptor | | | | | | | | Unspecified TF coefficients (TF_coefficient 1 ... TF_coefficient N) |

FIG. 27

| Offset | Value | | | | | | | | Description/Format |
|---|---|---|---|---|---|---|---|---|---|
| 0x06 | 7 | 6 | 5 | 4 | 3 | 2 | 1 | 0 | Transfer Function Type flag |
| | 1 | _ | _ | _ | _ | _ | _ | _ | Unspecified Transfer Function |
| | _ | 1 | _ | _ | _ | _ | _ | _ | BT.1886 |
| | _ | _ | 1 | _ | _ | _ | _ | _ | SMPTE ST 2084 |
| | _ | _ | _ | Reserved | | | | | reserved |
| | 7 | 6 | 5 | 4 | 3 | 2 | 1 | 0 | Unspecified TF Details |
| 0x07 | 0x0 -> 0xF | | | | _ | _ | _ | _ | Type of Unspecified Transfer Function |
| | _ | _ | _ | _ | 0x0 -> 0xF | | | | Number of coefficients in Unspecified Transfer Function |
| 0x08 | 0~3 | | _ | _ | _ | _ | _ | _ | Number of types |
| | _ | _ | 0~3 | | _ | _ | _ | _ | Bitdepth |
| | _ | _ | _ | _ | Reserved | | | | reserved |
| 0x09 | 0x00 -> 0xFF | | | | | | | | Lowest Brightness level of Sink device (higher 8 bits) |
| 0x0A | 1 | _ | _ | _ | _ | _ | _ | _ | Lowest Brightness level of Sink device (LSB) |
| | _ | 0x00 -> 0x3F | | | | | | | Highest Brightness level of Sink device (total 7 bits) |
| | 7 | 6 | 5 | 4 | 3 | 2 | 1 | 0 | Unspecified TF coefficients |
| 0x0B | 0x00 -> 0xFF | | | | | | | | TF_coefficient 1 |
| ... | ... | | | | | | | | ... |
| | 0x00 -> 0xFF | | | | | | | | TF_coefficient N |

FIG. 29

| DCI-P3 | SMPTE 431-2 |

Colorimetry Data Block

| Byte# | 7 | 6 | 5 | 4 | 3 | 2 | 1 | 0 |
|---|---|---|---|---|---|---|---|---|
| 1 | Tag Code (0x07) | | | | Length of following data block (in bytes) (0x03) | | | |
| 2 | Extended Tag Code (0x05) | | | | | | | |
| 3 | BT2020$_{RGB}$ | BT2020$_{YCC}$ | BT2020$_{cYCC}$ | Adobe$_{RGB}$ | Adobe$_{YCC601}$ | sYCC$_{601}$ | xvYCC$_{709}$ | xvYCC$_{601}$ |
| 4 | F47=0 | F46=0 | F45=0 | F44=0 | MD3 | MD2 | MD1 | MD0 |

Dynamic Range and Mastering InfoFrame

FIG. 31

| | CCg0 | Content Color Gamut Request Flag |
|---|---|---|

| | bits | | | | | | | |
|---|---|---|---|---|---|---|---|---|
| Byte# | 7 | 6 | 5 | 4 | 3 | 2 | 1 | 0 |
| 1 | Tag Code (0x07) | | | Length of following data block = n bytes | | | | |
| 2 | Extended Tag Code (0x06) | | | | | | | |
| 3 | CCG0 | F36=0 | ET_5 | ET_4 | ET_3 | ET_2 | ET_1 | ET_0 |
| 4 | SM_7 | SM_6 | SM_5 | SM_4 | SM_3 | SM_2 | SM_1 | SM_0 |
| 5 | Desired Content Max Luminance data (8 bits) | | | | | | | |
| 6 | Desired Content Max Frame-average Luminance data (8 bits) | | | | | | | |
| 7 | Desired Content Min Luminance data (8 bits) | | | | | | | |

HDR Static Metadata Data Block

FIG. 32

| InfoFrame Type Code | InfoFrame Type = 0x07 | | | |
|---|---|---|---|---|
| InfoFrame Version Number | Version = 0x01 | | | |
| Length of AVI InfoFrame | Length of following HDR Metadata InfoFrame | | | |
| Data Byte 1 | F17=0 | F16=0 | F15=0 | F14=0 | F13=0 | EOTF (3 bits) |
| Data Byte 2 | F27=0 | F26=0 | F25=0 | F24=0 | F23=0 | Static_Metadata_Descriptor ID (3 bits) |
| Data Byte 3 | Static_Metadata_Descriptor | | | |
| ... | ... | | | |
| Data Byte n | | | | |

Dynamic Range and Mastering InfoFrame

| Static_Metadata_Descriptor_ID | Metadata Descriptor |
|---|---|
| 0 | Static Metadata Type 1 |
| 1 - 17 | Reserved for future use |

Static_Metadata_Descriptor_ID

| Data Byte number | Contents | Group |
|---|---|---|
| Data Byte 3 | display_primaries_x[0],LSB | |
| Data Byte 4 | display_primaries_x[0],MSB | |
| Data Byte 5 | display_primaries_y[0],LSB | |
| Data Byte 6 | display_primaries_y[0],MSB | 1 |
| Data Byte 7 | display_primaries_x[1],LSB | |
| Data Byte 8 | display_primaries_x[1],MSB | |
| Data Byte 9 | display_primaries_y[1],LSB | |
| Data Byte 10 | display_primaries_y[1],MSB | |
| Data Byte 11 | display_primaries_x[2],LSB | |
| Data Byte 12 | display_primaries_x[2],MSB | |
| Data Byte 13 | display_primaries_y[2],LSB | |
| Data Byte 14 | display_primaries_y[2],MSB | |
| Data Byte 15 | white_point_x, LSM | 2 |
| Data Byte 16 | white_point_x, MSB | |
| Data Byte 17 | white_point_y, LSM | |
| Data Byte 18 | white_point_y, MSB | |
| Data Byte 19 | max_display_mastering_luminance, LSB | 3 |
| Data Byte 20 | max_display_mastering_luminance, MSB | |
| Data Byte 21 | min_display_mastering_luminance, LSB | 4 |
| Data Byte 22 | min_display_mastering_luminance, MSB | |
| Data Byte 23 | Maximum Contents Light Level, LSB | 5 |
| Data Byte 24 | Maximum Contents Light Level, MSB | |
| Data Byte 25 | Maximum Frame-average Light Level, LSB | 6 |
| Data Byte 26 | Maximum Frame-average Light Level, MSB | |
| Data Byte 27 | CE2 | CE1 | CE0 |

Static Metadata Descriptor Type 1

FIG. 34

| CCG_flag | Data Bytes 3 – 14 (display_primaries) and Data Byte 15-18 (white_point) are used for describing Content Color Gamut |
|---|---|

| InfoFrame Type Code | InfoFrame Type = 0x07 | | | | | |
|---|---|---|---|---|---|---|
| InfoFrame Version Number | Version = 0x01 | | | | | |
| Length of AVI InfoFrame | Length of following HDR Metadata InfoFrame | | | | | |
| Data Byte 1 | CCG_Flag | F16=0 | F15=0 | F14=0 | F13=0 | EOTF (3 bits) |
| Data Byte 2 | F27=0 | F26=0 | F26=0 | F24=0 | F23=0 | Static_Metadata_Descriptor ID (3 bits) |
| Data Byte 3 | Static_Metadata_Descriptor | | | | | |
| ... | ... | | | | | |
| Data Byte n | ... | | | | | |

Dynamic Range and Mastering InfoFrame

BROADCAST SIGNAL TRANSMISSION DEVICE, BROADCAST SIGNAL RECEPTION DEVICE, BROADCAST SIGNAL TRANSMISSION METHOD, AND BROADCAST SIGNAL RECEPTION METHOD

This application is a National Stage Application of International Application No. PCT/KR2016/011202 filed on Oct. 6, 2016, which claims the benefit of U.S. Provisional Application No. 62/238,097 filed on Oct. 6, 2015 and U.S. Provisional Application No. 62/238,721 filed on Oct. 8, 2015, all of which are hereby incorporated by reference in their entirety for all purposes as if fully set forth herein.

TECHNICAL FIELD

The present invention relates to an apparatus for transmitting a broadcast signal, an apparatus for receiving a broadcast signal and methods for transmitting and receiving a broadcast signal.

BACKGROUND ART

As a video signal processing rate has increased, research into a method for encoding/decoding ultra high definition (UHD) video has been conducted.

UHD content is aimed at providing improved image quality as compared to existing content. Research into and development of a UHD video element have been conducted in various fields in addition to a broadcast field. A demand for providing an improved user experience, which has not been provided by existing content in terms of color and brightness, has increased.

Therefore, efforts to increase the ranges of color and brightness among various elements configuring UHD video to provide a high-quality image have been continuously made.

A UHD display device is different from an existing display device in terms of improvement of color and brightness.

However, under various display device conditions, technology for optimally viewing UHD content has not been developed.

For example, if UHD content is supplied via a next-generation display device, the color or brightness of an image may be restricted according to the physical properties of a display device and thus content may not be appropriately displayed.

In order to adaptively control the color and brightness of content according to display device, content transformation should be performed based on accurate analysis of the properties of the display device. However, if UHD content is supplied via an external device, delivery of the properties of the display device may be restricted.

DISCLOSURE

Technical Problem

An object of the present invention devised to solve the problem lies in a video processing method and a video processing device capable of allowing a viewer to optimally view content including UHD content under various display device conditions.

Another object of the present invention devised to solve the problem lies in a video processing method and a video processing device capable of reducing color or brightness restrictions according to the physical properties of display devices when content including UHD content is displayed on various display devices.

A further object of the present invention devised to solve the problem lies in a video processing method and a video processing device capable of allowing a viewer to optimally view content including UHD content by delivering the properties of a display device even when content including the UHD content is supplied via an external device.

Technical Solution

The present invention provides a system capable of effectively supporting future broadcast services in an environment supporting future hybrid broadcasting using terrestrial broadcast networks and the Internet and related signaling methods.

Advantageous Effects

According to the embodiments of the present invention, it is possible to optimally view content including UHD content under various display device conditions.

According to the embodiments of the present invention, it is possible to reduce color or brightness restrictions according to the physical properties of display devices when content including UHD content is displayed on various display devices.

According to the embodiments of the present invention, it is possible to optimally view content including UHD content by delivering the properties of a display device even when content including the UHD content is supplied via an external device.

DESCRIPTION OF DRAWINGS

The accompanying drawings, which are included to provide a further understanding of the invention, illustrate embodiments of the invention and together with the description serve to explain the principle of the invention.

In the drawings:

FIG. 3 is a diagram showing a low level signaling (LLS) table and a service list table (SLT) according to one embodiment of the present invention;

FIG. 4 is a diagram showing a USBD and an S-TSID delivered through ROUTE according to one embodiment of the present invention;

FIG. 5 is a diagram showing a USBD delivered through an MMT according to one embodiment of the present invention;

FIG. 6 is a diagram showing link layer operation according to one embodiment of the present invention;

FIG. 7 is a diagram showing a link mapping table (LMT) according to one embodiment of the present invention;

FIG. 10 is a diagram showing an example of information delivered from the sink device to the source device according to an embodiment of the present invention;

FIG. 11 is a diagram showing a detailed field value of the above-described embodiment as an example of information delivered from the sink device to the source device according to an embodiment of the present invention;

FIG. 12 is a diagram showing a detailed example of a control option flag according to an embodiment of the present invention;

FIG. 13 is a diagram showing a detailed example of sink device dynamic range information according to an embodiment of the present invention;

FIG. 14 is a diagram showing a display parameters data block of a DisplayID as the display related information transmitted from the sink device to the source device according to an embodiment of the present invention;

FIG. 15 is a diagram showing a display device data block as the display related information described in an embodiment of the present invention;

FIG. 16 is a diagram showing another example of delivering the display related information from the sink device to the source device according to one embodiment of the present invention;

FIG. 17 is a diagram showing information to be delivered from the source device to the sink device according to an embodiment of the present invention;

FIG. 18 is a diagram showing a detailed example of post processing type information disclosed according to an embodiment of the present invention;

FIG. 19 is a diagram showing a detailed example of original color gamut information Orig_color_gamut according to an embodiment of the present invention;

FIG. 20 is a diagram showing another example of delivering video color information from the source device to the sink device according to an embodiment of the present invention;

FIG. 22 is a diagram showing the configuration of an EOTF type according to one embodiment of the present invention;

FIG. 23 is a diagram showing a method of signaling a DCI-P3 color gamut according to one embodiment of the present invention;

FIG. 25 is a diagram showing a method of signaling a DCI-P3 color gamut according to another embodiment of the present invention;

FIG. 26 is a diagram showing information on a transfer function which may be processed by the sink device according to one embodiment of the present invention;

FIG. 27 is a diagram showing detailed field values used in a method of delivering information on a transfer function which may be processed by the sink device according to one embodiment of the present invention;

FIG. 29 is a diagram showing a method of signaling display color gamut of a sink device to a source device from a sink device according to an embodiment of the present invention;

FIG. 31 is a diagram showing a method of signaling information on content color gamut to a source device from a sink device according to an embodiment of the present invention;

FIG. 32 is a diagram showing a method of signaling content color gamut to a sink device from a source device according to another embodiment of the present invention;

FIG. 34 is a diagram showing a method of signaling information on content color gamut to a sink device from a source device according to an embodiment of the present invention;

BEST MODE

The present invention provides apparatuses and methods for transmitting and receiving broadcast signals for future broadcast services. Future broadcast services according to an embodiment of the present invention include a terrestrial broadcast service, a mobile broadcast service, an ultra high definition television (UHDTV) service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

Figure 1:
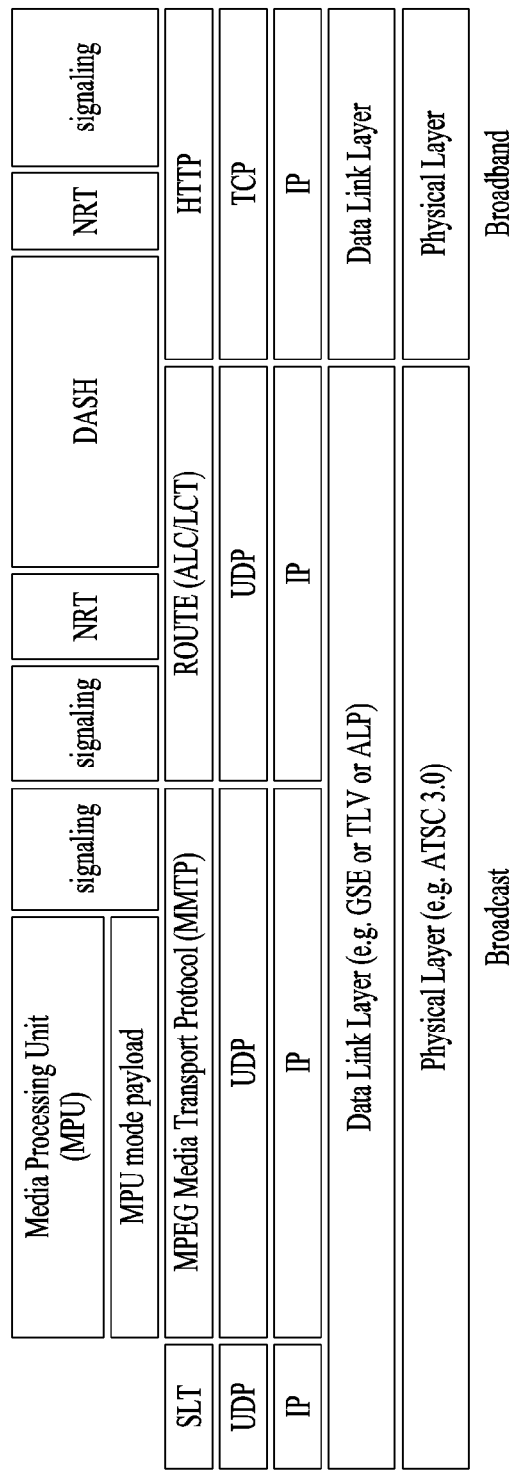
FIG. 1 is a diagram showing a protocol stack according to an embodiment of the present invention.

FIG. 1 is a diagram showing a protocol stack according to an embodiment of the present invention.

A service may be delivered to a receiver through a plurality of layers. First, a transmission side may generate service data. The service data may be processed for transmission at a delivery layer of the transmission side and the service data may be encoded into a broadcast signal and transmitted over a broadcast or broadband network at a physical layer.

Here, the service data may be generated in an ISO base media file format (BMFF). ISO BMFF media files may be used for broadcast/broadband network delivery, media encapsulation and/or synchronization format. Here, the service data is all data related to the service and may include service components configuring a linear service, signaling information thereof, non real time (NRT) data and other files.

The delivery layer will be described. The delivery layer may provide a function for transmitting service data. The service data may be delivered over a broadcast and/or broadband network.

Broadcast service delivery may include two methods.

As a first method, service data may be processed in media processing units (MPUs) based on MPEG media transport (MMT) and transmitted using an MMT protocol (MMTP). In this case, the service data delivered using the MMTP may include service components for a linear service and/or service signaling information thereof.

As a second method, service data may be processed into DASH segments and transmitted using real time object delivery over unidirectional transport (ROUTE), based on MPEG DASH. In this case, the service data delivered through the ROUTE protocol may include service components for a linear service, service signaling information thereof and/or NRT data. That is, the NRT data and non-timed data such as files may be delivered through ROUTE.

Data processed according to MMTP or ROUTE protocol may be processed into IP packets through a UDP/IP layer. In service data delivery over the broadcast network, a service list table (SLT) may also be delivered over the broadcast network through a UDP/IP layer. The SLT may be delivered in a low level signaling (LLS) table. The SLT and LLS table will be described later.

IP packets may be processed into link layer packets in a link layer. The link layer may encapsulate various formats of data delivered from a higher layer into link layer packets and then deliver the packets to a physical layer. The link layer will be described later.

In hybrid service delivery, at least one service element may be delivered through a broadband path. In hybrid service delivery, data delivered over broadband may include service components of a DASH format, service signaling information thereof and/or NRT data. This data may be processed through HTTP/TCP/IP and delivered to a physical layer for broadband transmission through a link layer for broadband transmission.

The physical layer may process the data received from the delivery layer (higher layer and/or link layer) and transmit the data over the broadcast or broadband network. A detailed description of the physical layer will be given later.

The service will be described. The service may be a collection of service components displayed to a user, the components may be of various media types, the service may be continuous or intermittent, the service may be real time or non real time, and a real-time service may include a sequence of TV programs.

The service may have various types. First, the service may be a linear audio/video or audio service having app based enhancement. Second, the service may be an app based service, reproduction/configuration of which is controlled by a downloaded application. Third, the service may be an ESG service for providing an electronic service guide (ESG). Fourth, the service may be an emergency alert (EA) service for providing emergency alert information.

When a linear service without app based enhancement is delivered over the broadcast network, the service component may be delivered by (1) one or more ROUTE sessions or (2) one or more MMTP sessions.

When a linear service having app based enhancement is delivered over the broadcast network, the service component may be delivered by (1) one or more ROUTE sessions or (2) zero or more MMTP sessions. In this case, data used for app based enhancement may be delivered through a ROUTE session in the form of NRT data or other files. In one embodiment of the present invention, simultaneous delivery of linear service components (streaming media components) of one service using two protocols may not be allowed.

When an app based service is delivered over the broadcast network, the service component may be delivered by one or more ROUTE sessions. In this case, the service data used for the app based service may be delivered through the ROUTE session in the form of NRT data or other files.

Some service components of such a service, some NRT data, files, etc. may be delivered through broadband (hybrid service delivery).

That is, in one embodiment of the present invention, linear service components of one service may be delivered through the MMT protocol. In another embodiment of the present invention, the linear service components of one service may be delivered through the ROUTE protocol. In another embodiment of the present invention, the linear service components of one service and NRT data (NRT service components) may be delivered through the ROUTE protocol. In another embodiment of the present invention, the linear service components of one service may be delivered through the MMT protocol and the NRT data (NRT service components) may be delivered through the ROUTE protocol. In the above-described embodiments, some service components of the service or some NRT data may be delivered through broadband. Here, the app based service and data regarding app based enhancement may be delivered over the broadcast network according to ROUTE or through broadband in the form of NRT data. NRT data may be referred to as locally cached data.

Each ROUTE session includes one or more LCT sessions for wholly or partially delivering content components configuring the service. In streaming service delivery, the LCT session may deliver individual components of a user service, such as audio, video or closed caption stream. The streaming media is formatted into a DASH segment.

Each MMTP session includes one or more MMTP packet flows for delivering all or some of content components or an MMT signaling message. The MMTP packet flow may deliver a component formatted into MPU or an MMT signaling message.

For delivery of an NRT user service or system metadata, the LCT session delivers a file based content item. Such content files may include consecutive (timed) or discrete (non-timed) media components of the NRT service or metadata such as service signaling or ESG fragments. System metadata such as service signaling or ESG fragments may be delivered through the signaling message mode of the MMTP.

A receiver may detect a broadcast signal while a tuner tunes to frequencies. The receiver may extract and send an SLT to a processing module. The SLT parser may parse the SLT and acquire and store data in a channel map. The receiver may acquire and deliver bootstrap information of the SLT to a ROUTE or MMT client. The receiver may acquire and store an SLS. USBD may be acquired and parsed by a signaling parser.

Figure 2:
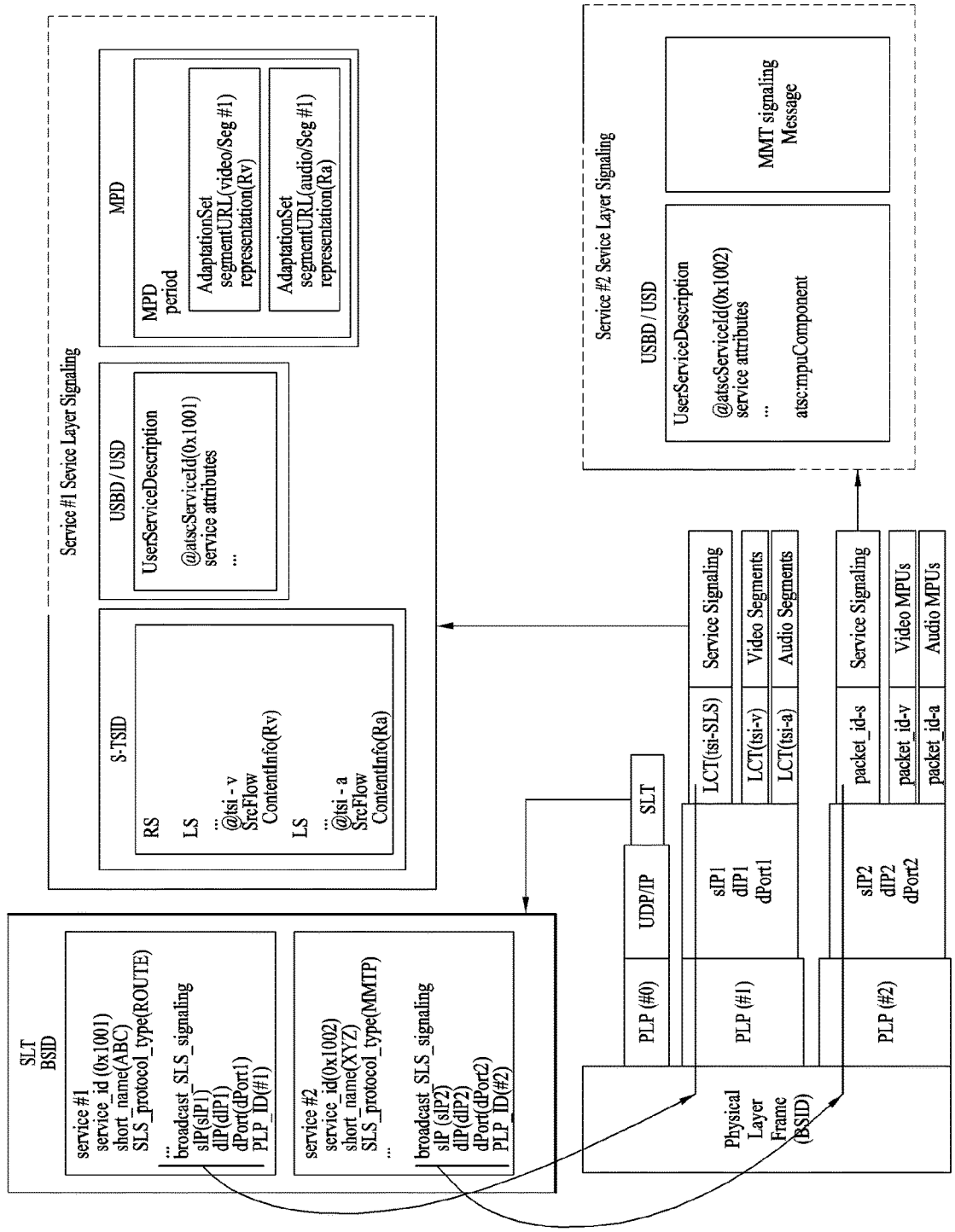
FIG. 2 is a diagram showing a service discovery procedure according to one embodiment of the present invention.

FIG. 2 is a diagram showing a service discovery procedure according to one embodiment of the present invention.

A broadcast stream delivered by a broadcast signal frame of a physical layer may carry low level signaling (LLS). LLS data may be carried through payload of IP packets delivered to a well-known IP address/port. This LLS may include an SLT according to type thereof. The LLS data may be formatted in the form of an LLS table. A first byte of every UDP/IP packet carrying the LLS data may be the start of the LLS table. Unlike the shown embodiment, an IP stream for delivering the LLS data may be delivered to a PLP along with other service data.

The SLT may enable the receiver to generate a service list through fast channel scan and provides access information for locating the SLS. The SLT includes bootstrap information. This bootstrap information may enable the receiver to acquire service layer signaling (SLS) of each service. When the SLS, that is, service signaling information, is delivered through ROUTE, the bootstrap information may include an LCT channel carrying the SLS, a destination IP address of a ROUTE session including the LCT channel and destination port information. When the SLS is delivered through the MMT, the bootstrap information may include a destination IP address of an MMTP session carrying the SLS and destination port information.

In the shown embodiment, the SLS of service #1 described in the SLT is delivered through ROUTE and the SLT may include bootstrap information sIP1, dIP1 and dPort1 of the ROUTE session including the LCT channel delivered by the SLS. The SLS of service #2 described in the SLT is delivered through MMT and the SLT may include bootstrap information sIP2, dIP2 and dPort2 of the MMTP session including the MMTP packet flow delivered by the SLS.

The SLS is signaling information describing the properties of the service and may include receiver capability information for significantly reproducing the service or providing information for acquiring the service and the service component of the service. When each service has separate service signaling, the receiver acquires appropriate SLS for a desired service without parsing all SLSs delivered within a broadcast stream.

When the SLS is delivered through the ROUTE protocol, the SLS may be delivered through a dedicated LCT channel of a ROUTE session indicated by the SLT. In some embodiments, this LCT channel may be an LCT channel identified by tsi=0. In this case, the SLS may include a user service bundle description (USBD)/user service description (USD), service-based transport session instance description (S-TSID) and/or media presentation description (MPD).

Here, USBD/USD is one of SLS fragments and may serve as a signaling hub describing detailed description information of a service. The USBD may include service identification information, device capability information, etc. The USBD may include reference information (URI reference) of other SLS fragments (S-TSID, MPD, etc.). That is, the USBD/USD may reference the S-TSID and the MPD. In addition, the USBD may further include metadata information for enabling the receiver to decide a transmission mode (broadcast/broadband network). A detailed description of the USBD/USD will be given below.

The S-TSID is one of SLS fragments and may provide overall session description information of a transport session carrying the service component of the service. The S-TSID may provide the ROUTE session through which the service component of the service is delivered and/or transport session description information for the LCT channel of the ROUTE session. The S-TSID may provide component acquisition information of service components associated with one service. The S-TSID may provide mapping between DASH representation of the MPD and the tsi of the service component. The component acquisition information of the S-TSID may be provided in the form of the identifier of the associated DASH representation and tsi and may or may not include a PLP ID in some embodiments. Through the component acquisition information, the receiver may collect audio/video components of one service and perform buffering and decoding of DASH media segments. The S-TSID may be referenced by the USBD as described above. A detailed description of the S-TSID will be given below.

The MPD is one of SLS fragments and may provide a description of DASH media presentation of the service. The MPD may provide a resource identifier of media segments and provide context information within the media presentation of the identified resources. The MPD may describe DASH representation (service component) delivered over the broadcast network and describe additional DASH presentation delivered over broadband (hybrid delivery). The MPD may be referenced by the USBD as described above.

When the SLS is delivered through the MMT protocol, the SLS may be delivered through a dedicated MMTP packet flow of the MMTP session indicated by the SLT. In some embodiments, the packet_id of the MMTP packets delivering the SLS may have a value of 00. In this case, the SLS may include a USBD/USD and/or MMT packet (MP) table.

Here, the USBD is one of SLS fragments and may describe detailed description information of a service as in ROUTE. This USBD may include reference information (URI information) of other SLS fragments. The USBD of the MMT may reference an MP table of MMT signaling. In some embodiments, the USBD of the MMT may include reference information of the S-TSID and/or the MPD. Here, the S-TSID is for NRT data delivered through the ROUTE protocol. Even when a linear service component is delivered through the MMT protocol, NRT data may be delivered via the ROUTE protocol. The MPD is for a service component delivered over broadband in hybrid service delivery. The detailed description of the USBD of the MMT will be given below.

The MP table is a signaling message of the MMT for MPU components and may provide overall session description information of an MMTP session carrying the service component of the service. In addition, the MP table may include a description of an asset delivered through the MMTP session. The MP table is streaming signaling information for MPU components and may provide a list of assets corresponding to one service and location information (component acquisition information) of these components. The detailed description of the MP table may be defined in the MMT or modified. Here, the asset is a multimedia data entity, is combined by one unique ID, and may mean a data entity used to one multimedia presentation. The asset may correspond to service components configuring one service. A streaming service component (MPU) corresponding to a desired service may be accessed using the MP table. The MP table may be referenced by the USBD as described above.

The other MMT signaling messages may be defined. Additional information associated with the service and the MMTP session may be described by such MMT signaling messages.

The ROUTE session is identified by a source IP address, a destination IP address and a destination port number. The LCT session is identified by a unique transport session identifier (TSI) within the range of a parent ROUTE session. The MMTP session is identified by a destination IP address and a destination port number. The MMTP packet flow is identified by a unique packet_id within the range of a parent MMTP session.

In case of ROUTE, the S-TSID, the USBD/USD, the MPD or the LCT session delivering the same may be referred to as a service signaling channel. In case of MMTP, the USBD/UD, the MMT signaling message or the packet flow delivering the same may be referred to as a service signaling channel.

Unlike the shown embodiment, one ROUTE or MMTP session may be delivered over a plurality of PLPs. That is, one service may be delivered through one or more PLPs. Unlike the shown embodiment, in some embodiments, components configuring one service may be delivered through different ROUTE sessions. In addition, in some embodiments, components configuring one service may be delivered through different MMTP sessions. In some embodiments, components configuring one service may be divided and delivered in a ROUTE session and an MMTP session. Although not shown, components configuring one service may be delivered through broadband (hybrid delivery).

FIG. 3 is a diagram showing a low level signaling (LLS) table and a service list table (SLT) according to one embodiment of the present invention.

One embodiment t3010 of the LLS table may include information according to an LLS_table_id field, a provider_id field, an LLS_table_version field and/or an LLS_table_id field.

The LLS_table_id field may identify the type of the LLS table, and the provider_id field may identify a service provider associated with services signaled by the LLS table. Here, the service provider is a broadcaster using all or some of the broadcast streams and the provider_id field may identify one of a plurality of broadcasters which is using the broadcast streams. The LLS_table_version field may provide the version information of the LLS table.

According to the value of the LLS_table_id field, the LLS table may include one of the above-described SLT, a rating region table (RRT) including information on a content advisory rating, SystemTime information for providing information associated with a system time, a common alert protocol (CAP) message for providing information associated with emergency alert. In some embodiments, the other information may be included in the LLS table.

One embodiment t3020 of the shown SLT may include an @bsid attribute, an @sltCapabilities attribute, an sltInetUrl element and/or a Service element. Each field may be omitted according to the value of the shown Use column or a plurality of fields may be present.

The @bsid attribute may be the identifier of a broadcast stream. The @sltCapabilities attribute may provide capability information required to decode and significantly reproduce all services described in the SLT. The sltInetUrl element may provide base URL information used to obtain service signaling information and ESG for the services of the SLT over broadband. The sltInetUrl element may further include an @urlType attribute, which may indicate the type of data capable of being obtained through the URL.

The Service element may include information on services described in the SLT, and the Service element of each service may be present. The Service element may include an @serviceId attribute, an @sltSvcSeqNum attribute, an @protected attribute, an @majorChannelNo attribute, an @minorChannelNo attribute, an @serviceCategory attribute, an @shortServiceName attribute, an @hidden attribute, an @broadbandAccessRequired attribute, an @svcCapabilities attribute, a BroadcastSvcSignaling element and/or an svcInetUrl element.

The @serviceId attribute is the identifier of the service and the @sltSvcSeqNum attribute may indicate the sequence number of the SLT information of the service. The @protected attribute may indicate whether at least one service component necessary for significant reproduction of the service is protected. The @majorChannelNo attribute and the @minozChannelNo attribute may indicate the major channel number and minor channel number of the service, respectively.

The @serviceCategory attribute may indicate the category of the service. The category of the service may include a linear A/V service, a linear audio service, an app based service, an ESG service, an EAS service, etc. The @shortServiceName attribute may provide the short name of the service. The @hidden attribute may indicate whether the service is for testing or proprietary use. The @broadbandAccessRequired attribute may indicate whether broadband access is necessary for significant reproduction of the service. The @svcCapabilities attribute may provide capability information necessary for decoding and significant reproduction of the service.

The BroadcastSvcSignaling element may provide information associated with broadcast signaling of the service. This element may provide information such as location, protocol and address with respect to signaling over the broadcast network of the service. Details thereof will be described below.

The svcInetUrl element may provide URL information for accessing the signaling information of the service over broadband. The sltInetUrl element may further include an @urlType attribute, which may indicate the type of data capable of being obtained through the URL.

The above-described BroadcastSvcSignaling element may include an @slsProtocol attribute, an @slsMajorProtocolVersion attribute, an @slsMinorProtocolVersion attribute, an @slsPlpId attribute, an @slsDestinationIpAddress attribute, an @slsDestinationUdpPort attribute and/or an @slsSourceIpAddress attribute.

The @slsProtocol attribute may indicate the protocol used to deliver the SLS of the service (ROUTE, MMT, etc.). The @slsMajorProtocolVersion attribute and the @slsMinorProtocolVersion attribute may indicate the major version number and minor version number of the protocol used to deliver the SLS of the service, respectively.

The @slsPlpId attribute may provide a PLP identifier for identifying the PLP delivering the SLS of the service. In some embodiments, this field may be omitted and the PLP information delivered by the SLS may be checked using a combination of the information of the below-described LMT and the bootstrap information of the SLT.

The @slsDestinationIpAddress attribute, the @slsDestinationUdpPort attribute and the @slsSourceIpAddress attribute may indicate the destination IP address, destination UDP port and source IP address of the transport packets delivering the SLS of the service, respectively. These may identify the transport session (ROUTE session or MMTP session) delivered by the SLS. These may be included in the bootstrap information.

FIG. 4 is a diagram showing a USBD and an S-TSID delivered through ROUTE according to one embodiment of the present invention.

One embodiment t4010 of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, an @serviceStatus attribute, an @fullMPDUri attribute, an @sTSIDUri attribute, a name element, a serviceLanguage element, a capabilityCode element and/or a deliveryMethod element. Each field may be omitted according to the value of the shown Use column or a plurality of fields may be present.

The @globalServiceID attribute is the globally unique identifier of the service and may be used for link with ESG data (Service@globalServiceID). The @serviceId attribute is a reference corresponding to the service entry of the SLT and may be equal to the service ID information of the SLT.

The @serviceStatus attribute may indicate the status of the service. This field may indicate whether the service is active or inactive.

The @fullMPDUri attribute may reference the MPD fragment of the service. The MPD may provide a reproduction description of a service component delivered over the broadcast or broadband network as described above. The @sTSIDUri attribute may reference the S-TSID fragment of the service. The S-TSID may provide parameters associated with access to the transport session carrying the service as described above.

The name element may provide the name of the service. This element may further include an @lang attribute and this field may indicate the language of the name provided by the name element. The serviceLanguage element may indicate available languages of the service. That is, this element may arrange the languages capable of being provided by the service.

The capabilityCode element may indicate capability or capability group information of a receiver necessary to significantly reproduce the service. This information is compatible with capability information format provided in service announcement.

The deliveryMethod element may provide transmission related information with respect to content accessed over the broadcast or broadband network of the service. The deliveryMethod element may include a broadcastAppService element and/or a unicastAppService element. Each of these elements may have a basePattern element as a sub element.

The broadcastAppService element may include transmission associated information of the DASH representation delivered over the broadcast network. The DASH representation may include media components over all periods of the service presentation.

The basePattern element of this element may indicate a character pattern used for the receiver to perform matching with the segment URL. This may be used for a DASH client to request the segments of the representation. Matching may imply delivery of the media segment over the broadcast network.

The unicastAppService element may include transmission related information of the DASH representation delivered over broadband. The DASH representation may include media components over all periods of the service media presentation.

The basePattern element of this element may indicate a character pattern used for the receiver to perform matching with the segment URL. This may be used for a DASH client to request the segments of the representation. Matching may imply delivery of the media segment over broadband.

One embodiment t4020 of the shown S-TSID may have an S-TSID root element. The S-TSID root element may include an @serviceId attribute and/or an RS element. Each field may be omitted according to the value of the shown Use column or a plurality of fields may be present.

The @serviceId attribute is the identifier of the service and may reference the service of the USBD/USD. The RS element may describe information on ROUTE sessions through which the service components of the service are delivered. According to the number of ROUTE sessions, a plurality of elements may be present. The RS element may further include an @bsid attribute, an @sIpAddr attribute, an @dIpAddr attribute, an @dport attribute, an @PLPID attribute and/or an LS element.

The @bsid attribute may be the identifier of a broadcast stream in which the service components of the service are delivered. If this field is omitted, a default broadcast stream may be a broadcast stream including the PLP delivering the SLS of the service. The value of this field may be equal to that of the @bsid attribute.

The @sIpAddr attribute, the @dIpAddr attribute and the @dport attribute may indicate the source IP address, destination IP address and destination UDP port of the ROUTE session, respectively. When these fields are omitted, the default values may be the source address, destination IP address and destination UDP port values of the current ROUTE session delivering the SLS, that is, the S-TSID. This field may not be omitted in another ROUTE session delivering the service components of the service, not in the current ROUTE session.

The @PLPID attribute may indicate the PLP ID information of the ROUTE session. If this field is omitted, the default value may be the PLP ID value of the current PLP delivered by the S-TSID. In some embodiments, this field is omitted and the PLP ID information of the ROUTE session may be checked using a combination of the information of the below-described LMT and the IP address/UDP port information of the RS element.

The LS element may describe information on LCT channels through which the service components of the service are transmitted. According to the number of LCT channel, a plurality of elements may be present. The LS element may include an @tsi attribute, an @PLPID attribute, an @bw attribute, an @startTime attribute, an @endTime attribute, a SrcFlow element and/or a RepairFlow element.

The @tsi attribute may indicate the tsi information of the LCT channel. Using this, the LCT channels through which the service components of the service are delivered may be identified. The @PLPID attribute may indicate the PLP ID information of the LCT channel. In some embodiments, this field may be omitted. The @bw attribute may indicate the maximum bandwidth of the LCT channel. The @startTime attribute may indicate the start time of the LCT session and the @endTime attribute may indicate the end time of the LCT channel.

The SrcFlow element may describe the source flow of ROUTE. The source protocol of ROUTE is used to transmit a delivery object and at least one source flow may be established within one ROUTE session. The source flow may deliver associated objects as an object flow.

The RepairFlow element may describe the repair flow of ROUTE. Delivery objects delivered according to the source protocol may be protected according to forward error correction (FEC) and the repair protocol may define an FEC framework enabling FEC protection.

FIG. 5 is a diagram showing a USBD delivered through MMT according to one embodiment of the present invention.

One embodiment of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, a Name element, a serviceLanguage element, a contentAdvisoryRating element, a Channel element, a mpuComponent element, a routeComponent element, a broadbandComponent element and/or a ComponentInfo element. Each field may be omitted according to the value of the shown Use column or a plurality of fields may be present.

The @globalServiceID attribute, the @serviceId attribute, the Name element and/or the serviceLanguage element may be equal to the fields of the USBD delivered through ROUTE. The contentAdvisoryRating element may indicate the content advisory rating of the service. This information is compatible with content advisory rating information format provided in service announcement. The Channel element may include information associated with the service. A detailed description of this element will be given below.

The mpuComponent element may provide a description of service components delivered as the MPU of the service. This element may further include an @mmtPackageId attribute and/or an @nextMmtPackageId attribute. The @mmtPackageId attribute may reference the MMT package of the service components delivered as the MPU of the service. The @nextMmtPackageId attribute may reference an MMT package to be used after the MMT package referenced by the @mmtPackageId attribute in terms of time. Through the information of this element, the MP table may be referenced.

The routeComponent element may include a description of the service components of the service. Even when linear service components are delivered through the MMT protocol, NRT data may be delivered according to the ROUTE protocol as described above. This element may describe information on such NRT data. A detailed description of this element will be given below.

The broadbandComponent element may include the description of the service components of the service delivered over broadband. In hybrid service delivery, some service components of one service or other files may be delivered over broadband. This element may describe information on such data. This element may further an @fullMPDUri attribute. This attribute may reference the MPD describing the service component delivered over broadband. In addition to hybrid service delivery, the broadcast signal may be weakened due to traveling in a tunnel and thus this element may be necessary to support handoff between broadband and broadband. When the broadcast signal is weak, the service component is acquired over broadband and, when the broadcast signal becomes strong, the service component is acquired over the broadcast network to secure service continuity.

The ComponentInfo element may include information on the service components of the service. According to the number of service components of the service, a plurality of elements may be present. This element may describe the type, role, name, identifier or protection of each service component. Detailed information of this element will be described below.

The above-described Channel element may further include an @serviceGenre attribute, an @serviceIcon attribute and/or a ServiceDescription element. The @serviceGenre attribute may indicate the genre of the service and the @serviceIcon attribute may include the URL information of the representative icon of the service. The ServiceDescription element may provide the service description of the service and this element may further include an @serviceDescrText attribute and/or an @serviceDescrLang attribute. These attributes may indicate the text of the service description and the language used in the text.

The above-described routeComponent element may further include an @sTSIDUri attribute, an @sTSIDDestinationIpAddress attribute, an @sTSIDDestinationUdpPort attribute, an @sTSIDSourceIpAddress attribute, an @sTSIDMajorProtocolVersion attribute and/or an @sTSIDMinorProtocolVersion attribute.

The @sTSIDUri attribute may reference an S-TSID fragment. This field may be equal to the field of the USBD delivered through ROUTE. This S-TSID may provide access related information of the service components delivered through ROUTE. This S-TSID may be present for NRT data delivered according to the ROUTE protocol in a state of delivering linear service component according to the MMT protocol.

The @sTSIDDestinationIpAddress attribute, the @sTSIDDestinationUdpPort attribute and the @sTSIDSourceIpAddress attribute may indicate the destination IP address, destination UDP port and source IP address of the transport packets carrying the above-described S-TSID. That is, these fields may identify the transport session (MMTP session or the ROUTE session) carrying the above-described S-TSID.

The @sTSIDMajorProtocolVersion attribute and the @sTSIDMinorProtocolVersion attribute may indicate the major version number and minor version number of the transport protocol used to deliver the above-described S-TSID, respectively.

The above-described ComponentInfo element may further include an @componentType attribute, an @componentRole attribute, an @componentProtectedFlag attribute, an @componentId attribute and/or an @componentName attribute.

The @componentType attribute may indicate the type of the component. For example, this attribute may indicate whether the component is an audio, video or closed caption component. The @componentRole attribute may indicate the role of the component. For example, this attribute may indicate main audio, music, commentary, etc. if the component is an audio component. This attribute may indicate primary video if the component is a video component. This attribute may indicate a normal caption or an easy reader type if the component is a closed caption component.

The @componentProtectedFlag attribute may indicate whether the service component is protected, for example, encrypted. The @componentId attribute may indicate the identifier of the service component. The value of this attribute may be the asset_id (asset ID) of the MP table corresponding to this service component. The @componentName attribute may indicate the name of the service component.

FIG. 6 is a diagram showing link layer operation according to one embodiment of the present invention.

The link layer may be a layer between a physical layer and a network layer. A transmission side may transmit data from the network layer to the physical layer and a reception side may transmit data from the physical layer to the network layer (t6010). The purpose of the link layer is to compress (abstract) all input packet types into one format for processing by the physical layer and to secure flexibility and expandability of an input packet type which is not defined yet. In addition, the link layer may provide option for compressing (abstracting) unnecessary information of the header of input packets to efficiently transmit input data. Operation such as overhead reduction, encapsulation, etc. of the link layer is referred to as a link layer protocol and packets generated using this protocol may be referred to as link layer packets. The link layer may perform functions such as packet encapsulation, overhead reduction and/or signaling transmission.

At the transmission side, the link layer (ALP) may perform an overhead reduction procedure with respect to input packets and then encapsulate the input packets into link layer packets. In addition, in some embodiments, the link layer may perform encapsulation into the link layer packets without performing the overhead reduction procedure. Due to use of the link layer protocol, data transmission overhead on the physical layer may be significantly reduced and the link layer protocol according to the present invention may provide IP overhead reduction and/or MPEG-2 TS overhead reduction.

When the shown IP packets are input as input packets (t6010), the link layer may sequentially perform IP header compression, adaptation and/or encapsulation. In some embodiments, some processes may be omitted. For example, the RoHC module may perform IP packet header compression to reduce unnecessary overhead. Context information may be extracted through the adaptation procedure and transmitted out of band. The IP header compression and adaption procedure may be collectively referred to as IP header compression. Thereafter, the IP packets may be encapsulated into link layer packets through the encapsulation procedure.

When MPEG 2 TS packets are input as input packets, the link layer may sequentially perform overhead reduction and/or an encapsulation procedure with respect to the TS packets. In some embodiments, some procedures may be omitted. In overhead reduction, the link layer may provide sync byte removal, null packet deletion and/or common header removal (compression). Through sync byte removal, overhead reduction of 1 byte may be provided per TS packet. Null packet deletion may be performed in a manner in which reinsertion is possible at the reception side. In addition, deletion (compression) may be performed in a manner in which common information between consecutive headers may be restored at the reception side. Some of the overhead reduction procedures may be omitted. Thereafter, through the encapsulation procedure, the TS packets may be encapsulated into link layer packets. The link layer packet structure for encapsulation of the TS packets may be different from that of the other types of packets.

First, IP header compression will be described.

The IP packets may have a fixed header format but some information necessary for a communication environment may be unnecessary for a broadcast environment. The link layer protocol may compress the header of the IP packet to provide a mechanism for reducing broadcast overhead.

IP header compression may include a header compressor/decompressor and/or an adaptation module. The IP header compressor (RoHC compressor) may reduce the size of each IP packet based on a RoHC method. Then, adaptation module may extract context information and generate signaling information from each packet stream. A receiver may parse signaling information related to a corresponding packet stream and attach the context information to the packet stream. The RoHC decompressor may recover a packet header to reconfigure an original IP packet. Hereinafter, IP header compression may refer to only IP header compressor via header compressor and may be a concept that combines IP header compression and the adaptation procedure by the adaptation module. This may be the same as in decompressing.

Hereinafter, adaptation will be described.

In transmission of a single-direction link, when the receiver does not have context information, the decompressor cannot restore the received packet header until complete context is received. This may lead to channel change delay and turn-on delay. Accordingly, through the adaptation function, configuration parameters and context information between the compressor and the decompressor may be transmitted out of band. The adaptation function may construct link layer signaling using context information and/or configuration parameters. The adaptation function may periodically transmit link layer signaling through each physical frame using a previous configuration parameter and/or context information.

Context information is extracted from the compressed IP packets and various methods may be used according to adaptation mode.

Mode #1 refers to a mode in which no operation is performed with respect to the compressed packet stream and an adaptation module operates as a buffer.

Mode #2 refers to a mode in which an IR packet is detected from a compressed packet stream to extract context information (static chain). After extraction, the IR packet is converted into an IR-DYN packet and the IR-DYN packet may be transmitted in the same order within the packet stream in place of an original IR packet.

Mode #3 (t6020) refers to a mode in which IR and IR-DYN packets are detected from a compressed packet stream to extract context information. A static chain and a dynamic chain may be extracted from the IR packet and a dynamic chain may be extracted from the IR-DYN packet. After extraction, the IR and IR-DYN packets are converted into normal compression packets. The converted packets may be transmitted in the same order within the packet stream in place of original IR and IR-DYN packets.

In each mode, the context information is extracted and the remaining packets may be encapsulated and transmitted according to the link layer packet structure for the compressed IP packets. The context information may be encapsulated and transmitted according to the link layer packet structure for signaling information, as link layer signaling.

The extracted context information may be included in a RoHC-U description table (RDT) and may be transmitted separately from the RoHC packet flow. Context information may be transmitted through a specific physical data path along with other signaling information. The specific physical data path may mean one of normal PLPs, a PLP in which low level signaling (LLS) is delivered, a dedicated PLP or an L signaling path. Here, the RDT may be context information (static chain and/or dynamic chain) and/or signaling information including information associated with header compression. In some embodiments, the RDT may be transmitted whenever context information is changed. In some embodiments, the RDT may be transmitted in every physical frame. To transmit the RDT in every physical frame, a previous RDT may be re-used.

The receiver may select a first PLP and first acquire signaling information of the SLT, the RDT, etc., prior to acquisition of a packet stream. Upon acquiring the signaling information, the receiver may combine the information to acquire mapping of service-IP information-context information-PLP. That is, the receiver may recognize IP streams through which a service is transmitted, IP streams transmitted through a PLP, and so on and acquire corresponding context information of the PLPs. The receiver may select a PLP for delivery of a specific packet stream and decode the PLP. The adaptation module may parse the context information and combine the context information with the compressed packets. Thereby, the packet stream may be recovered and transmitted to the RoHC de compressor. Then, decompression may be started. In this case, the receiver may detect an IR packet and start decompression from a first received IR packet according to an adaptation mode (mode 1), may detect an IR-DYN packet and start decompression from a first received IR-DYN packet (mode 2), or may start decompression from any general compressed packet (mode 3).

Hereinafter, packet encapsulation will be described.

The link layer protocol may encapsulate all types of input packets such as IP packets, TS packets, etc. into link layer packets. To this end, the physical layer processes only one packet format independently of the protocol type of the network layer (here, an MPEG-2 TS packet is considered as a network layer packet). Each network layer packet or input packet is modified into the payload of a generic link layer packet.

In the packet encapsulation procedure, segmentation may be used. If the network layer packet is too large to be processed in the physical layer, the network layer packet may be segmented into two or more segments. The link layer packet header may include fields for segmentation of the transmission side and recombination of the reception side. Each segment may be encapsulated into the link layer packet in the same order as the original location.

In the packet encapsulation procedure, concatenation may also be used. If the network layer packet is sufficiently small such that the payload of the link layer packet includes several network layer packets, concatenation may be performed. The link layer packet header may include fields for performing concatenation. In concatenation, the input packets may be encapsulated into the payload of the link layer packet in the same order as the original input order.

The link layer packet may include a header and a payload. The header may include a base header, an additional header and/or an optional header. The additional header may be further added according to situation such as concatenation or segmentation and the additional header may include fields suitable for situations. In addition, for delivery of the additional information, the optional header may be further included. Each header structure may be pre-defined. As described above, if the input packets are TS packets, a link layer header having packets different from the other packets may be used.

Hereinafter, link layer signaling will be described.

Link layer signaling may operate at a level lower than that of the IP layer. The reception side may acquire link layer signaling faster than IP level signaling of the LLS, the SLT, the SLS, etc. Accordingly, link layer signaling may be acquired before session establishment.

Link layer signaling may include internal link layer signaling and external link layer signaling. Internal link layer signaling may be signaling information generated at the link layer. This includes the above-described RDT or the below-described LMT. External link layer signaling may be signaling information received from an external module, an external protocol or a higher layer. The link layer may encapsulate link layer signaling into a link layer packet and deliver the link layer packet. A link layer packet structure (header structure) for link layer signaling may be defined and link layer signaling information may be encapsulated according to this structure.

FIG. 7 is a diagram showing a link mapping table (LMT) according to one embodiment of the present invention.

The LMT may provide a list of higher layer sessions carried through the PLP. In addition, the LMT may provide additional information for processing link layer packets carrying the higher layer sessions. Here, the higher layer session may be referred to as multicast. Information on IP streams or transport sessions transmitted through one PLP may be acquired through the LMT. In contrast, information on through which PLP a specific transport session is delivered may be acquired.

The LMT may be transmitted through any PLP identified to deliver the LLS. Here, the PLP for delivering the LLS may be identified by an LLS flag of L detail signaling information of a physical layer. The LLS flag may be a flag field indicating whether the LLS is transmitted through a corresponding PLP with respect to each PLP. Here, the L detail signaling information may be correspond to PLS2 data which will be described later.

That is, the LMT may also be transmitted through the same PLP along with the LLS. Each LMT may describe mapping between PLPs and IP address/port as described above. As described above, the LLS may include an SLT and, in this regard, the IP address/ports described by the LMT may be any IP address/ports related to any service, described by the SLT transmitted through the PLP such as a corresponding LMT.

In some embodiments, the PLP identifier information in the above-described SLT, SLS, etc. may be used to confirm information indicating through which PLP a specific transport session indicated by the SLT or SLS is transmitted may be confirmed.

In another embodiment, the PLP identifier information in the above-described SLT, SLS, etc. will be omitted and PLP information of the specific transport session indicated by the SLT or SLS may be confirmed by referring to the information in the LMT. In this case, the receiver may combine the LMT and other IP level signaling information to identify the PLP. Even in this embodiment, the PLP information in the SLT, SLS, etc. is not omitted and may remain in the SLT, SLS, etc.

The LMT according to the shown embodiment may include a signaling_type field, a PLP_ID field, a num_session field and/or information on each session. Although the LMT of the shown embodiment describes IP streams transmitted through one PLP, a PLP loop may be added to the LMT to describe information on a plurality of PLPs in some embodiments. In this case, as described above, the LMT may describe PLPs of all IP addresses/ports related to all service described by the SLT transmitted together using a PLP loop.

The signaling_type field may indicate the type of signaling information delivered by the table. The value of signaling_type field for the LMT may be set to 0x01. The signaling_type field may signaling_type field may be omitted. The PLP_ID field may identify a target PLP to be described. When the PLP loop is used, each PLP_ID field may identify each target PLP. Fields from the PLP_ID field may be included in the PLP loop. Here, the below-described PLP_ID field may be an identifier of one PLP of the PLP loop and the following fields may be fields corresponding to the corresponding PLP.

The num_session field may indicate the number of higher layer sessions delivered through the PLP identified by the PLP_ID field. According to the number indicated by the num_session field, information on each session may be included. This information may include a src_IP_add field, a dst_IP_add field, a src_UDP_port field, a dst_UDP_port field, an SID_flag field, a compressed_flag field, an SID field, and/or a context_id field.

The src_IP_add field, the dst_IP_add field, the src_UDPport field, and the dst_UDP_port field may indicate the source IP address, the destination IP address, the source UDP port and the destination UDP port of the transport session among the higher layer sessions delivered through the PLP identified by the PLP_ID field.

The SID_flag field may indicate whether the link layer packet delivering the transport session has an SID field in the optional header. The link layer packet delivering the higher layer session may have an SID field in the optional header and the SID field value may be equal to that of the SID field in the LMT.

The compressed_flag field may indicate whether header compression is applied to the data of the link layer packet delivering the transport session. In addition, presence/absence of the below-described context_id field may be determined according to the value of this field. When header compression is applied (compressed_flag=1), the RDT may be present and the PLP ID field of the RDT may have the same value as the corresponding PLP_ID field related to the present compressed_flag field.

The SID field may indicate a sub stream ID (SID) of link layer packets for delivering a corresponding transfer session. The link layer packets may include the SID having the same value as the present SID field in the optional header. Thereby, the receiver may filter link layer packets using information of the LMT and SID information of a link layer packet header without parsing of all link layer packets.

The context_id field may provide a reference for a context id (CID) in the RDT. The CID information of the RDT may indicate the context ID of the compression IP packet stream. The RDT may provide context information of the compression IP packet stream. Through this field, the RDT and the LMT may be associated.

In the above-described embodiments of the signaling information/table of the present invention, the fields, elements or attributes may be omitted or may be replaced with other fields. In some embodiments, additional fields, elements or attributes may be added.

In one embodiment of the present invention, service components of one service may be delivered through a plurality of ROUTE sessions. In this case, an SLS may be acquired through bootstrap information of an SLT. An S-TSID and an MPD may be referenced through the USBD of the SLS. The S-TSID may describe not only the ROUTE session delivered by the SLS but also transport session description information of another ROUTE session carried by the service components. To this end, the service components delivered through the plurality of ROUTE sessions may all be collected. This is similarly applicable to the case in which the service components of one service are delivered through a plurality of MMTP sessions. For reference, one service component may be simultaneously used by the plurality of services.

In another embodiment of the present invention, bootstrapping of an ESG service may be performed by a broadcast or broadband network. By acquiring the ESG over broadband, URL information of the SLT may be used. ESG information may be requested using this URL.

In another embodiment of the present invention, one service component of one service may be delivered over the broadcast network and the other service component may be delivered over broadband (hybrid). The S-TSID may describe components delivered over the broadcast network such that the ROUTE client acquires desired service components. In addition, the USBD may have base pattern information to describe which segments (which components) are delivered through which path. Accordingly, the receiver can confirm a segment to be requested from the broadband service and a segment to be detected in a broadcast stream.

In another embodiment of the present invention, scalable coding of a service may be performed. The USBD may have all capability information necessary to render the service. For example, when one service is provided in HD or UHD, the capability information of the USBD may have a value of "HD or UHD". The receiver may check which component is reproduced in order to render the UHD or HD service using the MPD.

In another embodiment of the present invention, through a TOI field of the LCT packets delivered through the LCT channel delivering the SLS, which SLS fragment is delivered using the LCT packets (USBD, S-TSID, MPD, etc.) may be identified.

In another embodiment of the present invention, app components to be used for app based enhancement/an app based service may be delivered over the broadcast network as NRT components or may be delivered over broadband. In addition, app signaling for app based enhancement may be performed by an application signaling table (AST) delivered along with the SLS. In addition, an event which is signaling for operation to be performed by the app may be delivered in the form of an event message table (EMT) along with the SLS, may be signaled in the MPD or may be in-band signaled in the form of a box within DASH representation. The AST, the EMT, etc. may be delivered over broadband. App based enhancement, etc. may be provided using the collected app components and such signaling information.

In another embodiment of the present invention, a CAP message may be included and provided in the above-described LLS table for emergency alert. Rich media content for emergency alert may also be provided. Rich media may be signaled by a CAP message and, if rich media is present, the rich media may be provided as an EAS service signaled by the SLT.

In another embodiment of the present invention, linear service components may be delivered over the broadcast network according to the MMT protocol. In this case, NRT data (e.g., app components) of the service may be delivered over the broadcast network according to the ROUTE protocol. In addition, the data of the service may be delivered over broadband. The receiver may access the MMTP session delivering the SLS using the bootstrap information of the SLT. The USBD of the SLS according to the MMT may reference the MP table such that the receiver acquires linear service components formatted into the MPU delivered according to the MMT protocol. In addition, the USBD may further reference the S-TSID such that the receiver acquires NRT data delivered according to the ROUTE protocol. In addition, the USBD may further reference the MPD to provide a reproduction description of data delivered over broadband.

In another embodiment of the present invention, the receiver may deliver location URL information capable of acquiring a file content item (file, etc.) and/or a streaming component to a companion device through a web socket method. The application of the companion device may acquire components, data, etc. through a request through HTTP GET using this URL. In addition, the receiver may deliver information such as system time information, emergency alert information, etc. to the companion device.

Figure 8:
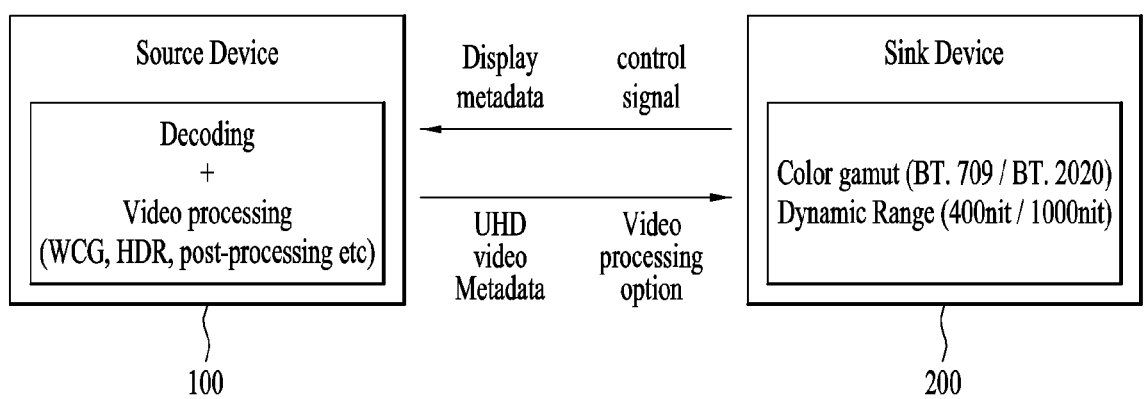
FIG. 8 is a diagram showing an example of connecting a source device and a sink device in order to transmit and receive a video image.

FIG. 8 is a diagram showing an example of connecting a source device and a sink device in order to transmit and receive a video image. Referring to this figure, the source device capable of performing image decoding and image quality processing and the sink device capable of outputting an image exchange information will now be described.

The source device 100 includes a device for decoding images received via various routes, such as broadcast, storage media such as Blu-ray, ultraviolet (UV) or secure content storage association (SCSA), or Internet protocol (IP) streaming, or a device capable of performing video processing for image quality processing. For example, the source device includes set-top boxes, players of storage media such as Blu-ray disc (BD) players, computers, etc.

Video processing of the source device 100 may include a method for changing image quality, such as wide color gamut (WCG), high dynamic range (HDR) or other post processing. In this case, video processing is not uniformly performed, but whether a video source can be played back on a display device is determined based on display information provided by the sink device, e.g., color gamut information or dynamic range information, and the image is converted into image quality suitable for the display device and provided thereto.

In addition, if the video processing procedure of the source device 100 needs to be controlled by the sink device 200, information about which video processing procedure is used may be received from the source device 100.

The source device 100 may receive display-related metainformation or display option information from the sink device 200. Based on the received information, the source device 100 may provide UHD video metadata and processing option information of processed video to the sink device 200. The sink device 200 may display video processed by the source device 100 based on the data or information provided by the source device 100. The sink device 200 may display video processed by the source device 100 according to the color gamut information suitable for the display or within the dynamic range.

Figure 9:
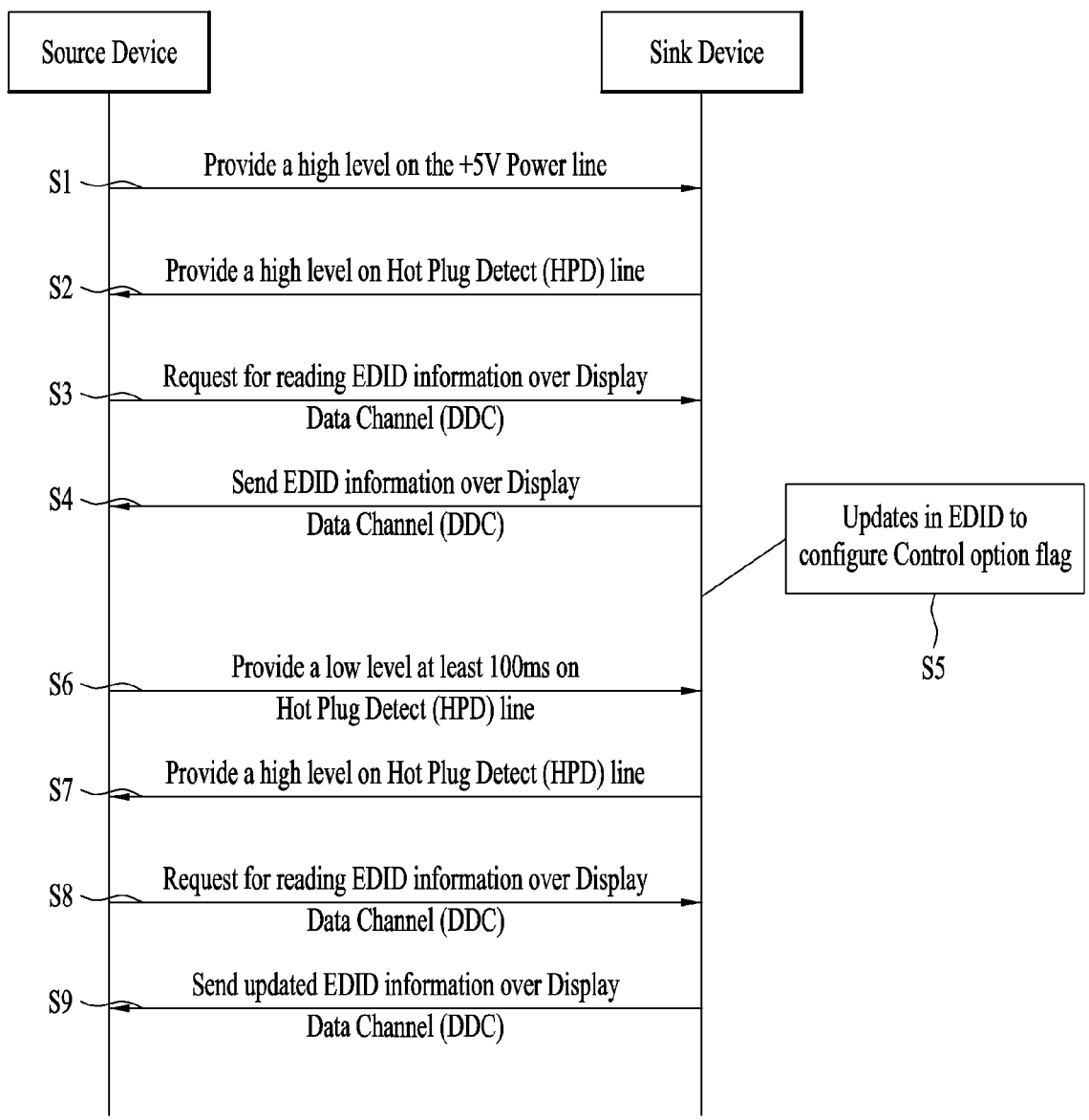
FIG. 9 is a diagram showing an embodiment of transmitting and receiving information when the source device is connected to the sink device according to an embodiment of the present invention.

FIG. 9 is a diagram showing an embodiment of transmitting and receiving information when the source device is connected to the sink device according to an embodiment of the present invention.

This example shows the case in which the source device is connected to the sink device via a wired interface such as a high definition multimedia interface (HDMI) or a DisplayPort. This example shows an embodiment in which, when the source device and the sink device are connected via the wired interface, the sink device 200 controls (activation or deactivation of) a high dynamic range (HDR) and WCG function of the source device 100 via a data block of the HDR of extended display identification data (EDID) and the source device reads the changed EDID of the sink device.

When the source device is connected to the sink device via the wired interface, the source device provides a high-level voltage on a +5V power line of the wired interface and the sink device confirms that the source device is connected (S1).

The sink device provides a high-level voltage on a hot plug detect line maintained at a low-level voltage to inform the source device that completion of connection with the sink device and display related information such as EDID (hereinafter, referred to as display related information) is ready to be read (S2).

The source device confirms that the hot plug detect line transitions to a high level and makes a request for reading the display related information from the sink device via a display data channel (S3) and the sink device transmits the display related information to the source device via the display data channel (S4).

When a field of a control option flag of an HDR data block of the display related information is changed by functional determination of the sink device or is signaled according to a user request (S5), the sink device provides a low-level voltage on the hot plug detect line and maintains this voltage for a predetermined time, for example, at least 100 ms, in order to inform the source device of the updated information of the display related information (S6).

When the source device can read the display related information, the sink device provides a high-level voltage to the hot plug line (S7) and the source device detects the high-level voltage and makes a request for reading the display related information via the display data channel (S8). Then, the sink device transmits the changed display related information via the display data channel (S9).

Based on such operation, an example of exchanging information between the source device and the sink device according to an embodiment of the present invention will be described.

According to the embodiment of the present invention, in response to the request of step S3 or S8, the sink device may deliver color gamut information and brightness information to the source device (included in S4 or S9).

The color gamut information may include color primary coordinates on a CIE xy diagram of a color gamut corresponding RGBW or color gamut information such as BT. 709 or BT. 2020. This information may be delivered via the color characteristics data block of a DisplayID defined in an interface. Brightness related information may include a maximum brightness value or minimum brightness value and may be delivered using a datablock defined in DisplayID, EDID or EDID extension information, etc. of the interface according to the example disclosed in the embodiment.

Then, the source device determines whether the color or brightness information of video needs to be adjusted based on the delivered display related information. If it is determined that the color or brightness information needs to be adjusted, the source device may perform transformation based on color mapping or dynamic range mapping information provided by video or autonomously provide color or brightness information of video.

The source device delivers final video obtained by adjustment to the sink device. At this time, color gamut or dynamic range related metadata of the final video may be delivered via an InfoFrame of the interface. The color gamut information may be delivered using color gamut information (e.g., BT. 709, BT. 2020, etc.) pre-defined in an AVI infoFrame of the interface. The dynamic range metadata related information may deliver maximum or minimum brightness information and may be delivered via a method of defining a new InfoFrame using the methods described in the embodiments or a method of extending an AVI InfoFrame.

If information on video processing of the source device needs to be provided when the source device delivers the final video, processing information of a video processing unit, such as HDR information or WCG information, may be delivered using post_processing_type in the InfoFrame via the methods described in the embodiments. In addition, if color transformation function information such as a new electro-optical transfer function (EOTF) needs to be defined and used in association with the HDR information of the final video, information on a new color transformation function may be delivered using an interface information flag.

The sink device determines whether processing of the final video by the source device is suitable and determines whether the source device needs to be controlled via feedback. In this case, the source device may be controlled via a control option flag in a datablock defined in DisplayID, EDID, EDID extension information, etc. described in the embodiments. If the result of video processing of the source device, such as WCG information or HDR information, is suitable, the sink device may activate bits related to the WCG information or HDR information such that the same processing continues.

If processing is unsuitable, the sink device may deactivate the bits related to the WCG information or HDR information to stop video processing.

The sink device changes video processing based on information included in the control option flag if the information delivered via the control option flag is different from video processing of the source device. If UHD video metadata is changed in association with changed video processing, the color characteristics information and brightness information in the InfoFrame may be changed and updated according to a video processing procedure with a changed post_processing_type. Then, step S5 is performed.

Hereinafter, information delivered from the sink device to the source will be described.

According to the embodiment of the present invention, if the source device processes HDR related information, the source device may perform video processing suitable for the sink device based on playback information of the sink device. In this case, the sink device may deliver information on a display dynamic range, e.g., sink black luminance level or sink white luminance level and a flag for controlling post processing of the source device to the source device. In this case, the data block of the DisplayID, EDID or EDID extension may be used, which will now be described in detail.

FIG. 10 is a diagram showing an example of information delivered from the sink device to the source device according to an embodiment of the present invention.

This figure shows an example of information delivered from the source device to the sink device using a data block of a DisplayID.

This figure shows an offset field and value field of the data block of the DisplayID and a description and format thereof. For example, if the offset field of the data block of the DisplayID is 0x00 and the value field is 0x14, an HDR data block may be indicated.

As shown in the figure, if the offset field is 0x03, a flag (control option flag) for controlling post processing of the source device may be indicated. A detailed example of the value will be described below.

If the offset field is 0x04 or 0x05, information on a brightness value (sink black luminance level, sink white luminance level, etc.) expressed by the sink device may be delivered.

The data block of the DisplayID may further include information necessary for video processing according to the offset field value. For example, if the offset field is 0x03, HDR related post processing related information may be delivered using a current reserved field, etc.

Here, the value of the offset field or the value field may be arbitrarily changed and a detailed example of the control option flag and an example of display information of the sink device will be described below.

FIG. 11 is a diagram showing a detailed field value of the above-described embodiment as an example of information delivered from the sink device to the source device according to an embodiment of the present invention.

As the information delivered from the sink device to the source device, the control option flag of the data block of the DisplayID is a field for controlling (on/off) a post processing procedure performed by the source device. According to the embodiment of the present invention, using this flag, various options to be provided in the future over the interface of the source/sink device may be indicated. Here, HDR and WCG related options are disclosed.

As described above, if the offset field of the data block of the DisplayID is 0x03, the control option flag for controlling the source device may be indicated. According to the bit location of the value field, HDR processing of the source device may be activated or WCG processing of the source device may be activated. In this example, this information is expressed using lower 2 bits.

The field disclosed in the present embodiment may be signaled by user request or controlled by functional determination of the sink device (if the processing capabilities of the sink device exceed those of the source device). In the embodiment of the present invention, information exchange between the sink and source devices may be performed with respect to frame rate control (FRC) and multilayer video enhancement function using reserved bits. Here, the offset field or the value field is an arbitrary value and may be changed.

FIG. 12 is a diagram showing a detailed example of a control option flag according to an embodiment of the present invention.

Information for controlling HDR and WCG processing performed by the source device may be set in lower 2 bits of the value field of the offset field of the control option flag. The following examples may be used by combinations of two flags.

In this example, if the value field is 00000000, this indicates that the source device does not perform any processing. For example, if the value field is 10000000, this indicates information on HDR processing of the source device, that is, indicates an option that the source device only performs HDR processing. As another example, if the value field is 01000000, this indicates information on WCG processing of the source device, that is, indicates an option that the source device only performs WCG processing.

As another example, if the value field is 11000000, this indicates control option information indicating that the source device performs both HDR and WCG processing based on the information delivered by the sink device, which may be used as an initial value.

FIG. 13 is a diagram showing a detailed example of sink device dynamic range information according to an embodiment of the present invention.

As shown, the sink device may deliver the dynamic range information of the sink device to the source device using the data block of the DisplayID and inform the source device of brightness information, etc. of the sink device.

The dynamic range information of the sink device indicates maximum and minimum physical brightness values (in nit or cd/m2) expressing the dynamic range of the display of the sink device.

For example, if the offset field of the data block of the DisplayID is 0x04 or 0x05, this indicates the dynamic range information of the sink device.

In this example, if the offset field of the data block of the DisplayID is 0x04, the brightness information of the lowest level of the sink device may be indicated using 8 bits higher than lower 8 bits.

If the offset field of the data block of the DisplayID is 0x05, the least significant bit (1 bit) of the value field indicates the brightness information of the lowest level of the sink device and the remaining bits of the value field indicate the brightness information of the highest level of the sink device.

Here, the offset field or the value field is an arbitrary value and may be changed.

The minimum brightness information (denoted by sink_black_luminance_level) and the maximum brightness information (sink_white_luminance_level) of the sink device indicated using this information are as follows.

For example, the minimum brightness information (sink_black_luminance_level) of the sink device indicates the minimum brightness of the display and may be expressed in units of 0.0001 in a range of 0 to 0.05 in consideration of general lowest brightness. That is, when the physical brightness of the display is brightness_black (in cd/m²), real minimum brightness may be calculated from the minimum brightness information (sink_black_luminance_level) as follows.

$$Brightness\_black = sink\_black\_luminance\_level \times 10000$$

(0<=sink_black_luminance_level<=500<29)

For example, in case of a reference monitor, minimum reference brightness is 0.05 cd/m² and 500 obtained by multiplying the minimum reference brightness by 10000 (decimal number) may be transmitted.

The maximum brightness information (sink_white_luminance_level) of the sink device indicates the maximum brightness of the display and may be expressed in units of 100 in a range of 100 to 10000 in consideration of general highest brightness. That is, when the physical brightness of the display is brightness_white (in cd/m²), real maximum brightness may be calculated from the maximum brightness information (sink_white_luminance_level) as follows.

$$Brightness\_white = sink\_white\_luminance\_level \times 100$$

(1<=sink_white_luminance_level<=100<27)

For example, in case of a reference monitor, maximum reference brightness is 100 cd/m² and 1 which is a quotient of the maximum reference brightness divided by 100 (decimal number) may be transmitted.

According to one embodiment of the present invention, the maximum brightness information of the sink device and/or the minimum brightness information of the sink device may indicate capabilities of the dynamic range of the display. That is, the maximum brightness information and/or the minimum brightness information of the sink device according to one embodiment of the present invention may indicate desired content max luminance data and/or desired content min luminance data necessary to optimally render content in consideration of capabilities of the display.

Another embodiment of delivering the display related information from the sink device to the source device will now be described.

FIG. 14 is a diagram showing a display parameters data block of a DisplayID as the display related information transmitted from the sink device to the source device according to an embodiment of the present invention.

As the display related information, the display parameters data block of the DisplayID may include all parameters of a monitor. As shown in this figure, the display parameters data block includes a horizontal or vertical image size (the offset field is 0x03 or 0x04), a horizontal or vertical pixel count (the offset field is 0x05 or 0x06), a flag indicating a function supportable by the monitor (the offset field is 0x0B), a gamma used in a transformation function (the offset field is 0x0C), a display aspect ratio (the offset field is 0x0D) and a pixel bit depth (the offset field is 0x0E).

According to the embodiment of the present invention, the display parameters data block may include the above-described control option flag information and sink device dynamic range information. That is, according to the embodiment of the present invention, the sink device may deliver the display parameters data block information including the above-described control option flag and sink device dynamic range information to the source device.

In this embodiment, if the offset field of the display parameters data block is 0x0F, this may indicate a control option flag and, if the offset field is 0x10 or 0x11, information on the brightness value (Sink Black Luminance Level, Sink White Luminance Level, etc.) of the sink device may be included.

The value field of the control option flag if the offset field is 0x0F, the value field of the sink device dynamic range information if the offset field is 0x10 or 0x11 and descriptions of the value fields are shown in FIGS. 11 to 13. Here, the offset field or the value field is an arbitrary value and may be changed.

In the embodiment of the present invention, transfer curve information suitable for HDR may be delivered via transfer characteristic gamma.

Another embodiment of delivering the display related information from the sink device to the source device will now be described.

FIG. 15 is a diagram showing a display device data block as the display related information described in an embodiment of the present invention. In the embodiment of the present invention, an example of information delivered from the source device to the sink device using the display device data block is described.

The display device data block includes information indicating the characteristics of the display panel. The display device data block includes display device technology (the offset field is 0x03), the operating mode of the display device (the offset field is 0x04), a video size expressible by a pixel count (the offset field is 0x05 to 0x08), a display aspect ratio (the offset field is 0x09 to 0x0A), a bit depth (the offset field is 0x0E) and a response time (the offset field is 0x0F). In the embodiment of the present invention, as shown in this figure, the control option flag information and the sink device dynamic range information of the display panel may be delivered to the source device in addition to the display device data block.

According to the embodiment of the present invention, if the offset field of the display device data block is 0x0F, this may indicate the control option flag and, if the offset field of the display device data block is 0x10 or 0x11, this may indicate the sink device dynamic range information.

The example of the value field if the offset field of the display device data block is 0x0F and the example of the value field if the offset field of the display device data block is 0x10 or 0x11 is shown in FIGS. 11 to 13 or FIG. 14. Here, the offset field or the value field is an arbitrary value and may be changed.

As another example of delivering the display related information from the sink device to the source device, the sink device may deliver the control option flag and the sink device dynamic range information using a vendor-specific data block of a DisplayID. The vendor-specific data block is data used when the sink device delivers information which is not defined in the data block and the above-described control option flag and sink device dynamic range information may be included in this data block.

As another example of delivering the display related information from the sink device to the source device, the sink device may use a product identification data block of the DisplayID.

The product identification data block of the DisplayID may include information on a manufacturer of a display device, a serial number of a display device, a product ID. etc. At this time, if the sink device can check information on each product via the manufacturer, manufacture date, and product ID of a display device, dynamic range information of each product may be delivered to the source device using this information. According to the present invention, if the product identification data block of the DisplayID indicates dynamic range information as the ID of the product, the control option flag is delivered using any one of the above-described embodiments.

As another example of delivering the display related information from the sink device to the source device, the sink device may deliver the display related information to the source device using a transfer characteristics data block. The transfer characteristics data block is a data block for delivering transfer curve related information of the display. The transfer characteristics data block is a data block indicating use of an arbitrary gamma function or support of a piecewise linear curve. Since a part defining peak luminance and lowest luminance of the display panel is not present, the sink device may deliver, to the source device, dynamic range information obtained by including the above-described control option flag and sink device dynamic range information in the transfer characteristics data block.

FIG. 16 is a diagram showing another example of delivering the display related information from the sink device to the source device according to one embodiment of the present invention. According to the embodiment of the present invention, the sink device may deliver the display related information to the source device using consumer electronics association (CEA) EDID extension information.

The sink device may deliver CEA EDID extension information including device attribute information supportable by the CE sink device to the source device in addition to the EDID defined in VESA of CEA-861. In this case, the sink device may deliver the dynamic range information shown in this figure to the source device.

The extension data block of the CEA EDID extension information may include video, audio, speaker allocation, vendor-specific and video capability data blocks. In order to identify the extension data block, a predefined tag code may be included bits 5 to 7 of a first byte of each data block.

According to the embodiment of the present invention, bits 5 to 7 of the first byte of the CEA EDID extension data block may include a tag code representing dynamic range information.

As shown in the figure, in the CEA EDID extension data block, the dynamic range information may be represented by minimum brightness information of the sink device (8 bits higher than lower 8 bits of the lowest brightness level of the sink device), LSB information of the minimum brightness of the sink device (lowest brightness level of the sink device (LSB)) and the maximum brightness information of the sink device (highest brightness level of the sink device (total 7 bits)) as described above. Bit allocation is arbitrary and may be changed. Accordingly, according to the embodiment of the present invention, the sink device may deliver the maximum/minimum brightness information of the sink device of the display related information to the source device using the CEA EDID extension information.

The maximum brightness information of the sink device according to one embodiment of the present invention may indicate the maximum brightness information capable of being processed by the sink device and the minimum brightness information of the sink device may indicate the minimum brightness information capable of being processed by the sink device.

Next, information to be delivered from the source device to the sink device according to an embodiment of the present invention will be described.

The source device may determine whether brightness and color gamut of content is suitable for the sink device based on the display related information and color gamut related information of the sink device and transform the brightness and color gamut of the content if necessary. In this case, if UHD video is processed, the source device should deliver information on which processing is performed and information on brightness and color gamut after video processing to the sink device. This is to control post processing of the sink device and this embodiment will now be described in detail.

According to the embodiment of the present invention, the source device may deliver UHD video processing related information to the sink device via an InfoFrame defined in CEA 861.

FIG. 17 is a diagram showing information to be delivered from the source device to the sink device according to an embodiment of the present invention.

In CEA 861, color gamut information of the InfoFrame defined as interface information of the source/sink device may be delivered via an AVI InfoFrame. In the embodiment of the present invention, the source device delivers information on UHD video processing to the sink device via the InfoFrame. Thereby, video processing information such as brightness information of UHD video, arbitrary color gamut information and HDR information or WCG information may be delivered to the sink device. According to the present embodiment, the source device may deliver information on post processing, brightness information of content after post processing, brightness information of content before post processing and color gamut information to the sink device.

The information on post processing includes information on the status of content and may be used as a response to a request of the sink device. The brightness information of the content after post processing may include minimum brightness information black_luminance_level of the content and maximum brightness information white_luminance_level of the content. The brightness information of the content before post processing may include minimum brightness information orig_black_luminance_level of the content and maximum brightness information orig_white_luminance_level of the content. The color gamut information of the content may be represented by Orig_color_gamut information. These will now be described in detail.

An InfoFrame type code indicates the type of this InfoFrame and may indicate a frame including information on UHD video processing if the value thereof is 0x07. Here, the information on UHD video processing may be referred to as dynamic range and mastering information. The dynamic range and mastering information according to one embodiment of the present invention may include dynamic range related information of content.

An infoFrame version number indicates the version information of this frame and length of HDR InfoFrame indicates the length information of HDR InfoFrame.

P3 to P0 fields of data byte 1 refer to fields for controlling (on/off) the prost processing procedure performed by the source device as a post_processing_type_flag. Here, using these fields, option information related to HDR information or WCG information is disclosed and a detailed description thereof will be given below. In one embodiment of the present invention, if content produced with BT. 709 is encoded and transmitted using BT. 2020, the contents color gamut and/or container color gamut may be distinguishably signaled using these fields and/or the below-described original color gamut Orig_color_gamut. This will be described in detail below.

R2 to R0 fields of data byte 1 indicate reserved bits and an E0 field indicates whether a new color transformation function (EOTF, etc.) is used via a new_EOTF_flag. The reserved bits are flags available in the future when a new EOTF suitable for HDR information is defined.

Data type 2 may include minimum brightness information of content and is represented by a black_luminance_level herein. In this embodiment, highest 8 bits of the minimum brightness information is represented in the data byte 2 field.

The minimum brightness information of content may be expressed in units of 0.0001 in a range of 0 to 0.05 in consideration of general lowest brightness. That is, when the physical brightness of the display is brightness_black (in cd/m$^2$), the following relationship is obtained.

Brightness_black=black_luminance_level×10000

(0<=black_luminance_level<=500<29)

For example, in case of a reference monitor, minimum reference brightness is 0.05 cd/m$^2$ and 500, obtained by multiplying the minimum reference brightness by 10000 (decimal number), may be expressed as brightness information.

Data byte 3 may include an LSB (1 bit) of minimum brightness information black_luminance_level of content and maximum brightness information (7 bits) white_luminance_level as shown in this figure.

The maximum brightness information white_luminance_level indicates the maximum brightness of the content and may be expressed in units of 100 in a range of 100 to 10000 in consideration of general highest brightness. That is, when the physical brightness of the display is brightness_white (in cd/m$^2$), the following relationship is obtained.

Brightness_white=white_luminance_level×100

(1<=white_luminance_level<=100<27)

For example, in case of a reference monitor, maximum reference brightness is 100 cd/m$^2$ and 1 which is a quotient of the maximum reference brightness divided by 100 (decimal number) may be expressed as brightness information.

Data byte 4 may express most significant bits (8 bits) of original minimum brightness information Orig_black_luminance_level of content and data byte 5 may express an LSB (1 bit) of original minimum brightness information Orig_black_luminance_level of content and original maximum brightness information Orig_white_luminance_level (7 bits) of content.

Original minimum brightness information Orig_black_luminance_level of content indicates the minimum brightness of content before HDR processing in the source device. The expression and range thereof are equal to those of black_luminance_level. In the present embodiment, the field may be transmitted only when HDR information indicates "on" in the post_processing_type.

Similarly, original maximum brightness information Orig_white_luminance_level of content indicates the maximum brightness of content before HDR processing in the source device. The expression and range thereof are equal to those of white_luminance_level. In the present embodiment, the field may be transmitted only when HDR information indicates "on" in post_processing_type.

According to one embodiment of the present invention, if signaling of the dynamic range differentiated from the contents dynamic range is necessary, original minimum brightness information Orig_black_luminance_level and the original maximum brightness information Orig_white_luminance_level may be used. At this time, the dynamic range differentiated from the contents dynamic range may include a dynamic range before and after image processing, a dynamic range used upon encoding, a dynamic range of a mastering display, a dynamic range of a target display, a dynamic range of a container, etc. Here, the dynamic range of the container may indicate a maximum/minimum dynamic range of the container when the dynamic range of original content and the dynamic range of the container are different. For example, the case in which the dynamic range of original content is different from the dynamic range of the container may include the case in which content produced in a low dynamic range (LDR) is encoded and transmitted in a high dynamic range (HDR), the case in which content produced in an HDR is encoded and transmitted in an LDR, the case in which content having a narrow dynamic range is transmitted to a container having a wide dynamic range, the case in which content having a wide dynamic range is transmitted to a container having a narrow dynamic range, etc. Here, the dynamic range of the container is different from the dynamic range of content and may indicate the dynamic range of the display. In addition, the mastering display may indicate a display subjected to a mastering procedure according to the brightness and/or color information of content and/or display. Accordingly, the dynamic range of the mastering display indicates the dynamic range supportable by the display.

Data type 6 may include original color gamut information Orig_color_gamut and S3 to S0 may include reserved bits. The original color gamut information Orig_color_gamut indicates the color gamut of content before WCG processing in the source device. Detailed examples of the standard color gamut will be described below. In the present embodiment, the field may be transmitted only when WCG indicates "on" in the post_processing_type.

In one embodiment of the present invention, if the source device does not perform separate color gamut mapping and the color gamut of the original content is different from that of the container, the value of the post_processing_type of 0000 (no processing) or 1111 (different color gamut) is signaled such that information on each color gamut is delivered to the display device while distinguishing between the contents color gamut and the container color gamut using the original color gamut information Orig_color_gamut. Here, the case in which the color gamut of the original content and the color gamut of the container are different may include the case in which content produced according to BT. 709 is encoded and transmitted with BT. 2020. In another embodiment of the present invention, the container color gamut may be expressed using colorimetry definition (C1, C0) of Data bytes 2 and 3 and extended colorimetry (EC2, EC1, EC0) in the AVI InfoFrame of CEA 861-F and the contents color gamut may be expressed using the Orig_color_gamut. In contrast, in another embodiment of the present invention, the contents color gamut may be expressed using colorimetry definition (C1, C0) of Data bytes 2 and 3 and extended colorimetry (EC2, EC1, EC0) in the AVI InfoFrame of CEA 861-F and the container color gamut may be expressed using the Orig_color_gamut. In another embodiment of the present invention, the contents color gamut may be expressed using the Orig_color_gamut and the container color gamut may be expressed using Red-x, Red-y, Green-x, Green-y, Blue-x, Blue-y, White-x and/or White-y. In contrast, in another embodiment of the present invention, the container color gamut may be expressed using the Orig_color_gamut and the contents color gamut may be expressed using Red-x, Red-y, Green-x, Green-y, Blue-x, Blue-y, White-x and/or White-y. Here, the container color gamut is different from the content color gamut and may indicate the display color gamut. Further, Orig_color_gamut, Red-x, Red-y, Green-x, Green-y, Blue-x, Blue-y, White-x and/or White-y may include chromaticity coordinates of three primary colors and/or white color of the container and/or display.

According to one embodiment of the present invention, if signaling of color gamut differentiated from contents color gamut is necessary, the above-described original gamut information Orig_color_gamut may be used. At this time, the color gamut different from the contents color gamut may include color gamut before and after image processing, container color gamut, color gamut used upon encoding, color gamut of a mastering display, color gamut of a target display, etc. Here, the mastering display may indicate a display subjected to a mastering procedure according to the brightness and/or color information of content and/or display. That is, color gamut of the mastering display indicates the color gamut supportable by the display.

Data byte 7 to data byte 16 refer to fields indicating arbitrary color gamut information. In this figure, arbitrary color gamut information include Red-x, Red-y, Green-x, Green-y, Blue-x, Blue-y, White-x and White-y.

Here, Red-x indicates an x coordinate of the R color of a color gamut (e.g., CIE 1931) using a value of 0 to 1 in the binary form. In the present embodiment, a total of 10 bits is used and higher 8 bits of data byte 9 and higher 2 bits of data byte 6 may be used.

Similarly, Red-y indicates a y coordinate of the R color of the color gamut (e.g., CIE 1931) using a value of 0 to 1 in the binary form. In the present embodiment, a total of 10 bits is used and higher 8 bits of data byte 10 and lower 2 bits of data byte 6 may be used.

The source device may deliver the color gamut information using data byte 7 to data byte 16 if appropriate information is not expressed in the original gamut information Orig_color_gamut of the content.

As another embodiment of the present invention, the original gamut information Orig_color_gamut shown in FIG. 17 is not used and the original gamut information may be used only using information corresponding to data byte 7 to data byte 16. Information corresponding to data byte 7 to data byte 16 is further used only when the original color gamut information Orig_color_gamut indicates a specific value.

Data byte 17 may include an E3 field, an E2 field, an E1 field, an E0 field and/or a number_of_coefficients field.

The E3 to E1 fields may be EOTF_type fields indicating the type of the EOTF used by a content producer for optimal image quality of HDR content. According to one embodiment of the present invention, a plurality of EOTF standards may be established and a content producer may arbitrarily define and use an EOTF. A detailed description of the meaning of the EOTF_type value will be given below.

The E0 field may indicate a private_EOTF_coeff_flag. If this field value is 1, this field may indicate that a separate coefficient is used according to EOTF_type. For example, if different coefficients are used for the same function, such as if a suitable EOTF coefficient is changed according to maximum brightness, in one embodiment of the present invention, a suitable coefficient may be transmitted using this field. In addition, according to another embodiment of the present invention, a separate parameter may be set and signaled via the EOTF_type. If this field value is 0, this field may indicate that a default parameter is used. Here, the parameter and the coefficient have the same meaning. According to one embodiment of the present invention, if the E0 field is 1, data bytes 18 to 18+N may be further used and, if the E0 field is 0, data bytes 18 to 18+N may not be used.

The number_of_coefficients field may indicate the number of coefficients used when the E0 field is 1.

Data type 18 may include an EOTF_additional_info field. The EOTF_additional_info field may indicate additional information according to the EOTF_type if additional information needs to be delivered according to the EOTF_type. For example, if a suitable EOTF coefficient is changed according to maximum brightness, this field may include information on target max brightness. According to one embodiment of the present invention, if coefficients of a plurality of EOTF functions according to various conditions need to be delivered according to the given EOTF_type, for example, if the coefficient is changed according to maximum brightness and all coefficients according to a variety of maximum brightnesses should be delivered, this field may be used to provide information on the coefficients. In this case, a method for designating a field indicating the number of conditions and designating EOTF_target_max_brightness and EOTF_coefficients 1 to N with respect to each condition may be used.

Data bytes 18+1 to 18+N may include EOTF_Coefficients 1 to N fields, respectively. The EOTF_Coefficients 1 to N fields may indicate a parameter value used if the E0 field is 1. In addition, this field may be used to transmit an arbitrary EOTF function.

Assume that the above-described information is transmitted from the source device to the sink device over an interface. However, this information may be transmitted via video (e.g., SEI message) or a separate metadata delivery method of a storage device. Accordingly, the same information may be defined in a video source or the source device may receive additional metadata of content via an external server.

According to one embodiment of the present invention, the InfoFrame shown in this figure may be referred to as a dynamic range and mastering InfoFrame.

FIG. 18 is a diagram showing a detailed example of post processing type information disclosed according to an embodiment of the present invention. As shown, the source device may deliver display related information and color gamut information to the sink device via the InfoFrame if the source device performs post processing of UHD video to suit the sink device.

The P3 to P0 fields of InfoFrame Data byte 1 indicate the post_processing_type and options related to HDR information or WCG information and the post processing type is shown in this figure.

For example, if the post_processing_type is 0000, this indicates that the source device does not perform any processing and, if the post_processing_type is 0001, this indicates that the source device performs dynamic range mapping.

For example, if the post_processing_type is 0010, this indicates that the source performs color gamut mapping and, if the post_processing_type is 0011, this indicates that the source device suitably performs processing based on the information delivered by the sink device. This value may be used as an initial value.

The values 0110 to 1000 of the postprocessing_type may be used for information exchange between the sink and source devices in the future, for the multilayer video enhancement function, and the values 1001 to 1110 may be used for user private.

For example, if the post_processing_type is 1111, this indicates that the original color gamut information Orig_color_gamut is used to distinguishably signal the contents color gamut and the container color gamut. That is, in one embodiment of the present invention, if signaling of the color gamut different from the contents color gamut is necessary, the post_processing_type field may be used. Similarly, in another embodiment of the present invention, if signaling of the dynamic range different from the contents dynamic range is necessary, the post_processing_type field may be used. In this case, for example, 1110 may be allocated as the postprocessing_type.

FIG. 19 is a diagram showing a detailed example of original color gamut information Orig_color_gamut according to an embodiment of the present invention.

As shown, if the source device processes UHD video to suit the sink device, the original color gamut information Orig_color_gamut of the content may be transmitted to the sink device.

In this example, if the field of the color gamut information Orig_color_gamut of the original content is 0000, the color of the original content is defined according to REC.709 and, if the Orig_color_gamut field of the content is 0001, the color of the original content is defined according to BT. 2020 NCL. Similarly, if this field is 0010, 0011, 0110 or 0101, this indicates that the colors of the original content are defined according to xvYCC, DCI-P3, Adobe RGB or BT. 2020 CL, respectively.

FIG. 20 is a diagram showing another example of delivering video color information from the source device to the sink device according to an embodiment of the present invention.

In the embodiment of the present invention, the format of AVI InfoFrame version 3 may be extended to deliver the post processing type information post_processing_type_flag, color transformation function information new_EOTF_flag and brightness information black_luminance_level or white_luminance_level of video processed by the source device to the sink device. In the embodiment of the present invention, the post processing type information post_processing_type_flag, color transformation function information new_EOTF_flag and brightness information black_luminance_level or white_luminance_level of video processed by the source device may be delivered to the sink device using a newly defined AVI InfoFrame over the interface of the source/sink device.

According to the disclosed AVI InfoFrame, the source device may deliver information on processed video to the sink device according to data byte. In this example, data bytes 14 to 29 may include data bytes 1 to 16 shown in FIGS. 11 to 13.

Accordingly, according to the present embodiment, the source information may deliver information on post processing, brightness information of content after post processing, brightness information of content before post processing and color gamut information to the sink device.

In the embodiment of the present invention, the format of AVI InfoFrame version 3 may be extended to deliver Orig_color_gamut, RGBW index, EOTF_type, private_EOTF_coeff_flag, Number of Coefficients, EOTF_additional_info and/or EOTF_Coefficient to the sink device and to deliver the above-described information using a newly defined AVI InfoFrame over the interface of the source/sink device.

In this figure, data bytes 30 to data byte 31+N may include data byte 17 to data byte 18+N shown in FIGS. 11 to 13.

Figure 21:
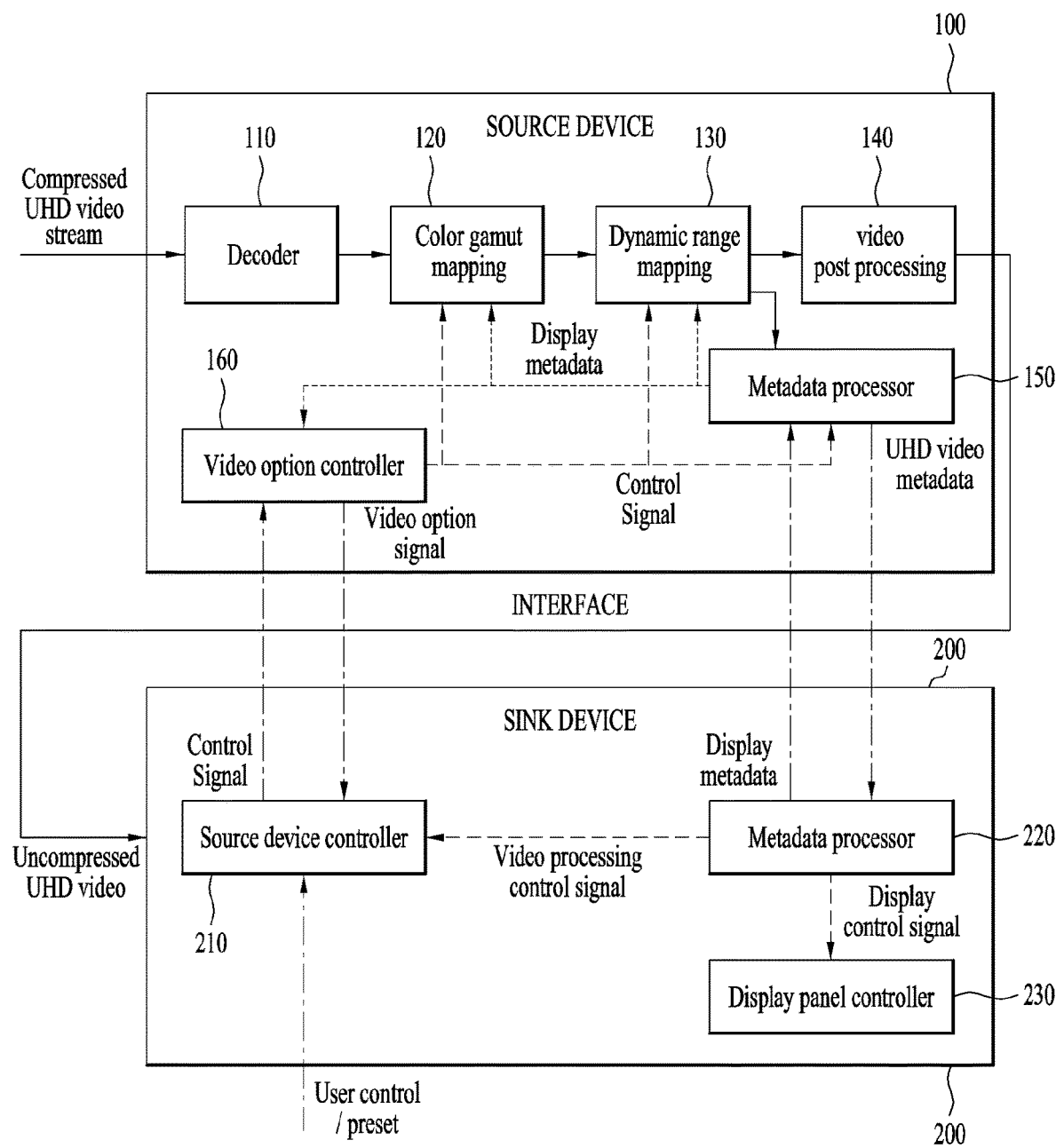
FIG. 21 is a diagram showing an example of a signal processing device according to one embodiment of the present invention and operations thereof.

FIG. 21 is a diagram showing an example of a signal processing device according to one embodiment of the present invention and operations thereof.

First, the example of the signal processing device according to one embodiment of the present invention includes a source device 100 and a sink device 200.

The source device 100 includes a decoder 110, a color gamut mapping unit 120, a dynamic range mapping unit 130, a post processing unit 140, a metadata processor 150 and an option controller 160.

The color gamut mapping unit 120, the dynamic range mapping unit 130 and the post processing unit 140 of the source device 100 may be referred to as a video processing unit and the color gamut mapping unit 120, the dynamic range mapping unit 130 and the post processing unit 140 of the video processing unit may individually operate upon video processing, if necessary, regardless of a previous block.

The sink device 200 includes a source device controller 210, a metadata processor 220 and a panel controller 230. If the source device 100 is connected to the sink device 200 via an interface, information may be transmitted and received according to the protocol shown in FIG. 9. Transmission and reception of information between the devices are performed via the interface.

The source device 100 may decode an encoded UHD video stream, perform post processing of decoded UHD video, if necessary, or process UHD video according to display capabilities of the sink device 200, and provide the processed UHD video to the sink device.

The sink device 200 may receive and display the UHD video decoded by the source device 100. The sink device may provide information on display capabilities of the sink device 200 to the source device 100 and receive and display the UHD video displayable by the sink device 200 from the source device 100.

The option controller 160 of the source device 100 may transmit a video option signal via the interface with the sink device 200 to request the display related information. The display related information may include color gamut information and display brightness related information. The video option information transmitted from the source device 100 to the sink device 200 is shown in FIGS. 11 to 14.

The metadata processor 150 of the source device 100 may transmit metadata of UHD video to the sink device 100 and the sink device 220 may transmit metadata related to the display device to the source device 100.

The decoder of the source device 100 may receive and decode the encoded UHD video stream.

The color gamut mapping unit 120 maps color gamut information of the decoded UHD video. In this case, the color gamut information of the UHD video may be mapped and changed using the display related information of the sink device 200 or the metadata of the UHD video.

Alternatively, the dynamic range mapping unit 130 may map the dynamic range of the decoded UHD video. In this case, the dynamic range of the UHD video may be mapped and changed using the display related information of the sink device 200 or the metadata of the UHD video.

The post processing unit 140 may perform video post processing with respect to the decoded UHD video. Video post processing may be performed based on the display related information.

The metadata processor 150 may transmit the metadata of the UHD video to the sink device 200 and receive the metadata related to the display from the sink device.

The option controller 160 may transmit the video option information to the sink device 200 and receive display option information from the sink device 200. Examples of the display option information transmitted from the sink device 100 to the source device 200 are shown in FIGS. 10 to 16. The video option information transmitted from the source device 100 to the sink device 200 is shown in FIGS. 17 to 20.

The source device controller 210 of the sink device 200 may transmit a control signal for controlling the source device 100 and receive a user control signal from a user.

The metadata controller 220 of the sink device 200 may receive the metadata of the UHD video from the source device 100 and transmit the metadata related to the display device to the source device 100. The metadata processor 220 may transmit a video processing control signal to the source device controller 210 to enable the source device controller 210 to transmit the control signal.

The panel controller 230 may control the display panel according to the display control signal of the metadata processor 220.

In the embodiment of the present invention, it is possible to perform video processing adapted to the display. That is, in the embodiments of the present invention, information exchange between the source and sink devices, video processing and display methods may be changed according to capabilities of the sink device 200. Hereinafter, an example of transmitting the metadata information of the sink device 200 to the source device 100, performing video processing based on the display related information at the source device and receiving the display related information and outputting video by the sink device 200 will be described in detail.

First, a first embodiment in which the sink device 200 is a high-end UHD sink device will be described.

If the sink device 200 is a high-end UHD sink device, the sink device 200 may transmit display related metadata to the source device 100. The display related information may include display color gamut information (or color primary information corresponding to RGBW) and display dynamic range related information (e.g., peak luminance information and black luminance information). The metadata processor 220 of the sink device 200 may process the display related information. For example, the metadata processor 220 of the sink device 200 may store the display related information, which will be referred to upon content processing and display, and request this information from the source device 100 as necessary.

The source device 100 may deliver the control signal of the source device 100 as well as the color and brightness related metadata of the display when delivering the display related information to the sink device 200.

The control signal of the source device 100 may include information indicating which video processing of the source device 100 is possible. The control signal of the source device 100 may be generated based on a displayable color gamut delivered by the source device controller 210 of the sink device 200 and may be generated according to a default processing request without information received from the sink device 200.

Although an information exchange process between the source and sink devices is performed when the two devices are connected, information exchange between the two devices may be performed again when broadcast or streaming content is received in a state wherein the source and sink devices are connected, when content is changed or when a specific scene is changed.

Video processing when the sink device 200 is a high-end UHD sink device may be performed as follows.

The post processing unit 140 of the source device 100 may determine whether post processing should be performed with respect to the decoded UHD video based on the display related information of the sink device 200 from the metadata processor 150 and output a control signal thereof. The source device 100 may perform video processing related to WCG information or HDR information of the UHD video, e.g., color gamut mapping or dynamic range mapping. If display capabilities of the sink device 200 are sufficient to play the UHD video back after video post processing, the option controller 160 of the source device 100 may deliver the information to the post processing unit 140. If the WCG information or HDR information of the video is changed based on the display color gamut information or brightness information of the sink device 200, the metadata processor 150 may transmit the display related metadata to the color gamut mapping unit 120 or the dynamic range mapping unit 130.

The post processing unit 140 of the source device 100 may perform post processing using metadata transmitted along with video, for example, a WCG SEI message or an HDR SEI message. The video decoder 110 or the post processing unit 140 may decode enhancement layer data to increase image quality of output video, if enhancement layer data is transmitted according to scalable coding.

Although the image quality of output video may be further improved to suit the image quality of the display, if additional information for video processing is not received from the sink device 200, the source device 100 may autonomously perform an image quality improvement function.

The metadata processor 150 delivers UHD video metadata including the WCG information or HDR information of the decoded or post-processed video to the sink device 200. In addition, the option controller 160 may contain the processed video processing information in the video option information (video option signal) and transmit the video option information to the source device controller 210. The video option information is shown in FIGS. 17 to 20.

If the video decoded by the decoder 110 is suitable for the display, the video may be delivered to the sink device 200 for playback, without separate processing of the WCG information or HDR information of video. In this case, the option controller 160 may signal information indicating that separate video processing is not performed.

The sink device 200 may display the UHD video via the display device. In this case, although the sink device 200 may play the processed video back via the source device 100 without transformation, it may be determined whether the video delivered by the source device 100 has been processed to suit the display. The source device controller 210 of the sink device 200 may output the control signal to the source device 100. The source device controller 210 of the sink device 200 may determine a portion in which a problem occurs during video processing of the source device 100 and output the control signal to stop video processing, if the video is not suitably processed. This control function may be turned on/off according to a user request. The sink device 200 may output a video processing option to the user and provide a menu or interface UI for controlling the same to the user.

The sink device 200 may analyze information on the metadata processor 220 of the sink device 200 and then control the display device via the panel controller 230 to provide a playback environment suitable for content, if brightness and color of the display device can be controlled.

Next, a second embodiment wherein the sink device 200 is a legacy UHD sink device will be described. For the same portions as the first embodiment, refer to the first embodiment.

The sink device 200 transmits metadata of the legacy UHD sink device to the source device 100. The metadata of the legacy UHD sink device may include color gamut information (or color primary information corresponding to RGBW) and display dynamic range related information (e.g., peak luminance information and black luminance information) of the display. The metadata processor 150 of the source device 100 may receive and process the metadata of the legacy UHD sink device.

The option controller 160 of the source device 100 determines whether post processing is performed with respect to the decoded UHD video based on the display related information acquired by the metadata processor 150 and outputs a control signal.

If capabilities of the display are insufficient for image quality (color and brightness) of video to be displayed, appropriate processing may be performed with respect to the video to achieve color and brightness expressible by the display. For example, the color gamut mapping unit 120 or the dynamic range mapping unit 130 of the source device 100 may map the color gamut information or dynamic range information of the UHD video to information suitable for the display device.

The source device 100 may change WCG information or HDR information of video data based on the metadata of the video data, e.g., the WCG SEI message, the HDR SEI message, etc. or according to the function of the source device 100. If the WCG information or HDR information of the video data is changed, the option controller 160 may contain the WCG information or the HDR information in the video option information (video option signal) and transmit the video option information to the sink device 200. The video option information is shown in FIGS. 17 to 20.

If the color and brightness range of the display of the sink device 200 can support the color and dynamic range of video, the source device 100 may transmit the video to the sink device 200 without additional video processing. The option controller 160 of the source device 100 may deliver information indicating that the metadata, WCG information or HDR information of the UHD video is not processed to the sink device 200 via the video option signal.

The display device of the sink device 200 may play the UHD video back. If it is determined that the WCG information or HDR information of the UHD video received by the sink device 200 is not suitable for the display device of the sink device 200, the source device controller 210 may deliver a control signal to the source device 100. The user can control the functions related to the display device via a user menu or an interface UI.

FIG. 22 is a diagram showing the configuration of an EOTF type according to one embodiment of the present invention.

According to one embodiment of the present invention, EOTF type "000" indicates a reserved bit, EOTF type "001" indicates that an EOTF_type1 transformation curve is used, EOTF type "010" indicates that an EOTF_type2 transformation curve is used, and EOTF types "011" to "111" indicate user private.

FIG. 23 is a diagram showing a method of signaling a DCI-P3 color gamut according to one embodiment of the present invention.

In the present invention, the following embodiments will be described in order to define a new color gamut such as DCI-P3.

In one embodiment of the present invention, using C1 and C0 fields included in data byte 2 of an existing AVI InfoFrame 17010, use of EC2 to EC0 fields included in data byte 3 for extension of the color gamut may be signaled (17020). Using reserved bits of EC2 to EC0 fields, DCI-P3 may be signaled. That is, when EC2 to EC0 are 111, use of DCI-P3 is indicated (17030, 17040).

In another embodiment of the present invention, colorimetry extension may be signaled using reserved bits of EC2 to EC0 fields included in data byte 3 of the existing AVI InfoFrame 17010. That is, when EC2 to EC0 are 111, this may indicate colorimetry extension (17030, 17050). Using S3 to S0 fields which are reserved bits included in data byte 6 of the above-described dynamic range and mastering InfoFrame or data byte 19 of the above-described AVI InfoFrame, use of DCI-PC may be signaled (17060, 17070). At this time, less than or more than 3 bits may be used as necessary. Further, using S3 to S0 fields, which are the reserved bits, use of an arbitrary color gamut may be signaled (17070).

Figure 24:
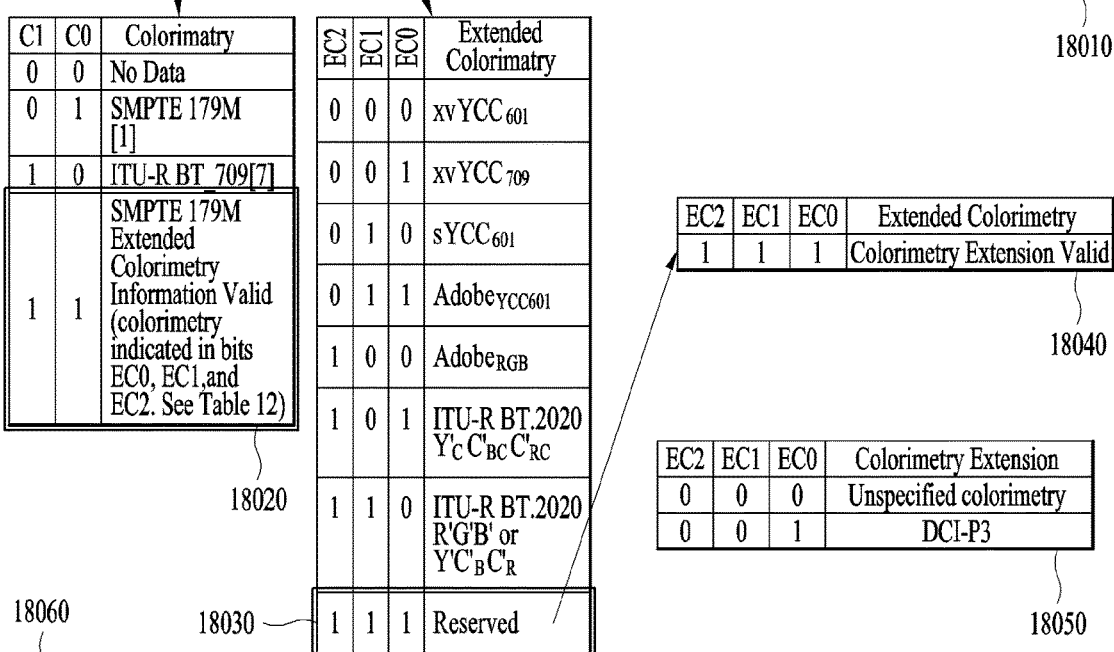
FIG. 24 is a diagram showing a method of signaling a DCI-P3 color gamut according to another embodiment of the present invention.

FIG. 24 is a diagram showing a method of signaling a DCI-P3 color gamut according to another embodiment of the present invention.

In one embodiment of the present invention, using C1 and C0 fields included in data byte 2 of an existing AVI InfoFrame 18010, use of EC2 to EC0 fields included in data byte 3 for extension of the color gamut may be signaled (18020). In addition, colorimetry extension may be signaled using reserved bits of EC2 to EC0 fields included in data byte 3 of the existing AVI InfoFrame 18010. That is, when EC2 to EC0 are 111, this may indicate colorimetry extension (18030, 18050). Using reserved bits of the dynamic range and mastering InfoFrame according to one embodiment of the present invention, use of DCI-P3 may be signaled. For example, as shown in the figure, reserved bits included in data byte 1 may be used (18060). Further, use of an arbitrary color gamut may be signaled using the above-described reserved bits (18050).

FIG. 25 is a diagram showing a method of signaling a DCI-P3 color gamut according to another embodiment of the present invention.

In one embodiment of the present invention, a new InfoFrame may be defined in order to signal a new color gamut such as DCI-P3. For example, an InfoFrame having an information type of 0x08 may be newly defined and bits for the new color gamut may be allocated to signal use of the new color gamut.

In another embodiment of the present invention, as a method of extending an existing AVI InfoFrame format, as shown in this figure, data byte 14 may be newly defined. At this time, using C1 and C0 fields included in data byte 2 of the existing AVI InfoFrame, use of EC2 to EC0 fields included in data type 3 for extension of the color gamut may be signaled. In addition, using reserved bits of EC2 to EC0 fields included in data byte 3 of the existing AVI InfoFrame, colorimetry extension may be signaled. That is, when EC2 to EC0 are 111, this may indicate colorimetry extension. Here, in one embodiment of the present invention, in consideration of backward compatibility, if EC2 to EC0 fields of data byte 3 are 111 while the same version number as the existing AVI InfoFrame is used, colorimetry extension may be recognized and data byte 14 may be read. In contrast, even if backward compatibility is not considered, as shown in this figure, in another embodiment of the present invention, information indicating that a new version number is assigned to the AVI InfoFrame, the length of the AVI InfoFrame is set to 14 and the InfoFrame of up to data byte 14 is defined may be signaled, colorimetry extension is recognized if EC2 to EC0 fields of data byte 3 are 111, and colorimetry may be signaled.

FIG. 26 is a diagram showing information on a transfer function which may be processed by the sink device according to one embodiment of the present invention.

This figure shows an example of information delivered from the source device to the sink device using a data block of a DisplayID. The case in which the offset field is 0x00 to 0x05 was described above.

In one embodiment of the present invention, as shown in this figure, the offset field may be assigned to further deliver transfer function related information of the sink device. At this time, in one embodiment of the present invention, a predefined transfer function (BT. 1886, SMPTE ST 2084, etc.) may be signaled and detailed information of an unspecified transfer function may be signaled.

As shown in this figure, if the offset field is 0x06, this may indicate a transfer function type flag. The transfer function type flag may signal a transfer function type. In one embodiment of the present invention, since each transfer function is designated as a flag, all supported transfer functions are simultaneously signaled even when a plurality of transfer functions is supported. Here, the transfer function may include BT. 1886, SMPTE ST 2084, Traditional gamma—SDR Luminance Range, Traditional gamma—HDR Luminance Range, etc. Here, the transfer function may include an electro optical transfer function (EOTF).

If the offset field is 0x07 to 0x0A, this may indicate unspecified TF details. In one embodiment of the present invention, if an unspecified transfer function is supported, this may be expressed via separate signaling. For example, if an unspecified transfer function is supported, transfer function type flag=0x80 (hexadecimal) or 10000000 (binary) may be indicated. In one embodiment of the present invention, in consideration of various unspecified transfer functions, the type of each transfer function may be signaled and additional information such as the number of necessary coefficients, bit depth or maximum/minimum brightness information may be delivered according to each type. At this time, the transfer function type may indicate any one of various types of transfer functions. If a plurality of transfer functions is delivered, a bit indicating that the plurality of transfer functions is used (e.g., a number_of_types field) is separately assigned and the order of the plurality of transfer functions may be indicated using this field. A detailed description of information included in the unspecified TF details will be described below.

If the offset field is 0x0B or more, this may indicate unspecified TF coefficients. In one embodiment of the present invention, coefficient information of an unspecified transfer function may be delivered using this field. The above-described coefficient information may include information on an intersection of the transfer function, a section and a used function.

According to one embodiment of the present invention, information delivered from the sink device to the source device may be referred to as extended display identification data (EDID). Here, the EDID may indicate capabilities of the sink device. Further, the EDID includes an HDR static metadata data block indicating HDR capabilities of the sink device and the HDR static metadata may include information on the above-described transfer function type.

The EDID according to one embodiment of the present invention may include one or more data blocks.

The HDR static metadata according to one embodiment of the present invention may be included in a data block and transmitted. Further, the HDR static metadata may include information indicating whether the data block includes the HDR static metadata and/or information indicating the length of the data block.

FIG. 27 is a diagram showing detailed field values used in a method of delivering information on a transfer function which may be processed by the sink device according to one embodiment of the present invention.

According to one embodiment of the present invention, an offset field value "0x06" is used to indicate the transfer function type, offset field values "0x07" to "0x0A" are used to indicate unspecified TF details, and offset field values 0x0B to or more are used to indicate unspecified TF coefficients. Here, the unspecified TF details indicate additional information of an unspecified transfer function if the sink device supports the unspecified transfer function and may include the type of an unspecified transfer function, the number of coefficients in the unspecified transfer function, the number of types of each transfer function if a plurality of transfer functions configures the unspecified transfer function, bit depth, the lowest brightness level of the sink device and/or the highest brightness level of the sink device.

If the offset field is 0x06, a higher 1 bit of the value may indicate that the unspecified transfer function may be processed, a next 1 bit thereof may indicate that the EOTF according to BT. 1886 may be processed and a next 1 bit thereof may indicate that the EOTF according to SMPTE ST 2084 may be processed.

If the offset field is 0x07, higher 4 bits of the value may be used to indicate the type of the unspecified transfer function and the lower 4 bits may be used to indicate the number of coefficients in the unspecified transfer function.

If the offset field is 0x08, higher 2 bits of the value may be used to the number of types and next 2 bits thereof may be used to indicate the bit depth.

If the offset field is 0x09, the value may indicate the lowest brightness level of the sink device.

If the offset field is 0x0A, the value indicates the lowest brightness level of the sink device using an LSB and indicates the highest brightness level of the sink device using the remaining 7 bits.

If the offset field is 0x0B or more, the value may indicate coefficient information used in the unspecified transfer function.

Figure 28:
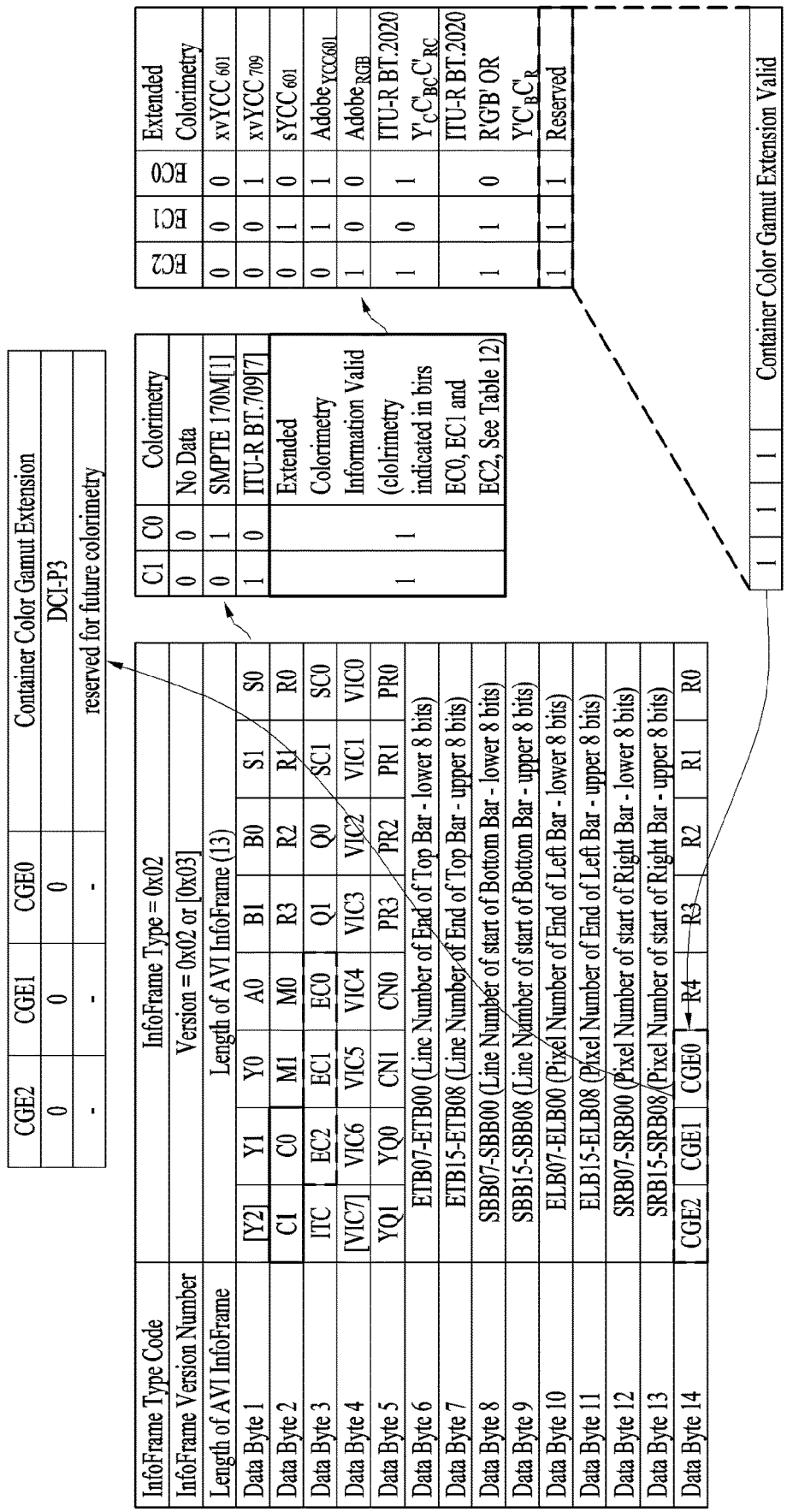
FIG. 28 is a diagram showing a method of signaling container color gamut to a sink device from a source device according to an embodiment of the present invention.

FIG. 28 is a diagram showing a method of signaling container color gamut to a sink device from a source device according to an embodiment of the present invention.

According to an embodiment of the present invention, to support display performance in a wide range in terms of wide color gamut (WCG), signaling for additional colorimetry may be required. According to an embodiment of the present invention, a DCI-P3 color space may be signaled.

According to an embodiment of the present invention, a broadcast system may signal two different types of colorimetry. The broadcast system may signal container color gamut and content color gamut.

According to an embodiment of the present invention, the container color gamut may represent color gamut used during transmission, encoding, and/or distribution of content. That is, the container color gamut may represent color gamut of a transmission, encoding, and/or distribution system. The container color gamut may represent theoretical color boundary of coded values. For example, when BT.2020 color gamut is used in a transmission, encoding, and/or distribution procedure, the BT.2020 color gamut may correspond to the container color gamut.

According to an embodiment of the present invention, the content color gamut may represent color gamut of actual content. That is, the content color gamut may represent color gamut used in an imaging system for image-processing content and/or a mastering environment for mastering content. The content color gamut may refer to actual color boundary of mastered content. For example, when DCI-P3 color gamut is used in an imaging system and/or a mastering environment, the DCI-P3 color gamut may correspond to the content color gamut.

According to an embodiment of the present invention, content mastered with DCI-P3 is transmitted according to a container format based on BT.2020 and content mastered with BT.709 may be transmitted according to a container format based on BT.2020.

According to an embodiment of the present invention, the content color gamut may be used to determine a color mapping process used by a sink device. The content color gamut may be usefully used when the container color gamut is not matched with display color gamut of the sink device. For example, when the container color gamut is matched with display color gamut, content may be directly displayed without conversion of color gamut but, when the container color gamut is not matched with the display color gamut, color gamut needs to be converted and content color gamut may be used to appropriately convert color gamut. The broadcast system may signal content color gamut to provide more various color senses and to enhance the quality of displayed content.

According to an embodiment of the present invention, when the DCI-P3 content is encoded in a BT.2020 container and reproduced by a DCI-P3 display, a sink device may generally adjust color of content to represent color of content in a color boundary of a display. As an adjustment result, gamut may contract and color distortion of content may occur due to contraction of gamut. However, according to an embodiment of the present invention, when information on content color gamut is provided, a DCI-P3 display may display content without color distortion (or minimum color distortion) due to gamut contraction (color gamut clipping). According to the present embodiment, since the content color gamut is matched with the display color gamut, initial intention of a manufacturer may be maintained. In addition, a viewer may experience content with initially intended color sense.

According to an embodiment of the present invention, container color gamut may be signaled by a colorimetry field and/or an extended colorimetry field in an auxiliary video information (AVI) InfoFrame data block. According to an embodiment of the present invention, DCI-P3 may be defined in a reserved space in the fields. For example, a colorimetry field value "11" and an extended colorimetry field value "111" may indicate that information on container color gamut is signaled in the AVI InfoFrame and the information on the container color gamut may be signaled through the container color gamut extension field. However, to signal the information on the container color gamut, when an extended colorimetry field value "111" is used, there is no remaining space for colorimetry to be added later.

According to an embodiment of the present invention, the broadcast system may extend conventional colorimetry signaling and signal container color gamut. In detail, the broadcast system may define an additional extension field in the AVI InfoFrame and/or dynamic range and mastering (DRM) InfoFrame and signal the container color gamut. A reserved space of current colorimetry signaling may be used to indicate availability of additional colorimetry extension. As described above, the broadcast system may use an extension field and, thus, may signal container color gamut without change in a signaling procedure of conventional colorimetry.

This diagram shows a method of signaling container color gamut to a sink device from a source device according to an embodiment of the present invention.

Referring to the diagram, AVI InfoFrame according to an embodiment of the present invention may include a Y field (Y2, Y1, and Y0 of Data Byte 1), a colorimetry field (C1 and C0 of Data Byte 2), an extended colorimetry field (EC2, EC1, and EC0 of Data Byte 3), and/or a container color gamut extension field (CGE2, CGE1, and CGE0 of Data Byte 14).

According to an embodiment of the present invention, a colorimetry field value "11" may indicate that an extended colorimetry field has an effective value and an extended colorimetry field value "111" may indicate that a container color gamut extension field has an effective value. Accordingly, when a colorimetry field value has "11" and an extended colorimetry field value has "111", the container color gamut extension field may have an effective value. According to an embodiment of the present invention, a container color gamut extension field value "000" may indicate that container color gamut is DCI-P3 and remaining values may indicate colorimetry to be used later.

According to an embodiment of the present invention, the Y field may represent color component sample format and chroma sampling format of content. The colorimetry field may be used together with the extended colorimetry field and may represent colorimetry of content. In addition, colorimetry of content may be signaled by a combination of the Y field, the colorimetry field, and the extended colorimetry field.

According to an embodiment of the present invention, all color gamut and container color gamut of content may be signaled using fields included in the AVI InfoFrame.

FIG. 29 is a diagram showing a method of signaling display color gamut of a sink device to a source device from a sink device according to an embodiment of the present invention.

According to an embodiment of the present invention, the broadcast system may signal DCI-P3 colorimetry using a reserved bit in a colorimetry data block of EDID. The broadcast system may signal DCI-P3 colorimetry without change in other colorimetry signaling in conventional EDID.

According to an embodiment of the present invention, the colorimetry data block may be one of EDID and may include a Tag Code field (Byte 1, bits 5-7), a Length field (Byte 1, bits 0-4), an Extended Tag Code field (Byte 2), a Colorimetry flag field (Byte 3), and/or a reserved field (Byte 4, bits 0-3, MD0, MD1, MD2, MD3). The Tag Code field and the Extended Tag Code field may identify that the data block is a colorimetry data block including colorimetry of a display. The Length field may indicate a length of the data block. The Colorimetry flag field may indicate colorimetry of a display. That is, a Colorimetry flag field value 1 may indicate that content encoded to corresponding colorimetry is capable of being displayed by a sink device. The reserved field may be used to indicate metadata related to future gamut.

According to an embodiment of the present invention, the broadcast system may signal that display color gamut is DCI-P3 color gamut defined in SMPTE 431-2 using MD0 that is one of reserved fields. According to the present embodiment, a MD0 bit value 1 may indicate that a display of a sink device is capable of displaying content encoded to DCI-P3 and 0 may indicate that the display of the sink device is not capable of displaying content encoded to DCI-P3.

Figure 30:
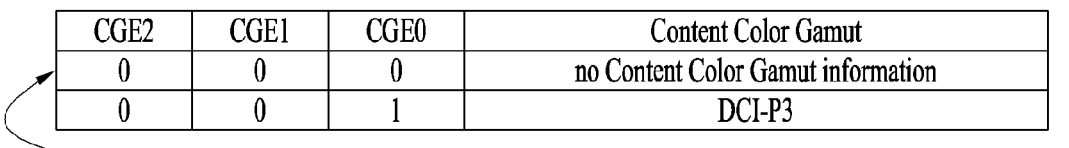
FIG. 30 is a diagram showing a method of signaling content color gamut to a sink device from a source device according to an embodiment of the present invention.

FIG. 30 is a diagram showing a method of signaling content color gamut to a sink device from a source device according to an embodiment of the present invention.

According to an embodiment of the present invention, the source device may define a new content color gamut field in AVI InfoFrame and/or DRM InfoFrame to provide information on content color gamut to the sink device.

According to an embodiment of the present invention, when the sink device is not capable of understanding signaling of content color gamut according to the aforementioned embodiment, colorimetry signaling present in the AVI InfoFrame may be used.

According to an embodiment of the present invention, the sink device may transmit a flag of a request for information on content color gamut to the source device.

Referring to the diagram, according to an embodiment of the present invention, the DRM InfoFrame may include content color gamut fields CCG2, CCG1, and CCG0. A content color gamut field value "000" may indicate that the field is not used. That is, a content color gamut field value "000" may indicate that the content color gamut is the same as container color gamut or may indicate that there is no information on content color gamut. A content color gamut field value "001" may indicate that content color gamut is DCI-P3. Other values of the content color gamut field may indicate that other colorimetry of the content color gamut.

FIG. 31 is a diagram showing a method of signaling information on content color gamut to a source device from a sink device according to an embodiment of the present invention.

According to an embodiment of the present invention, a broadcast system may signal a content color gamut request using a reserved bit in a HDR static metadata data block of EDID. The broadcast system may signal content color gamut request without change in other signaling in conventional EDID.

According to an embodiment of the present invention, the HDR static metadata data block may be one of EDID and may include a Tag Code field (Byte 1, bits 5-7), a Length field (Byte 1, bits 0-4), an Extended Tag Code field (Byte 2), and/or a content color gamut request flag field (Byte 3, bit 7). The Tag Code field and the Extended Tag Code field may identify that the data block is a HDR static metadata data block including a content color gamut request flag. The Length field may indicate a length of the data block. The content color gamut request flag field (CCG0) may indicate whether a sink device makes a request to the source device for information on content color gamut. A content color gamut request flag field value "0" may indicate that signaling of content color gamut is not required and a content color gamut request flag field value "1" may indicate that the sink device requires information on content color gamut. For example, the source device may receive an HDR static metadata data block from the sink device and check the content color gamut request flag field and, then, when a value of the field is "1", information on content color gamut may be transmitted to the sink device.

FIG. 32 is a diagram showing a method of signaling content color gamut to a sink device from a source device according to another embodiment of the present invention.

According to an embodiment of the present invention, the source device may define a new content color gamut field in a static metadata descriptor Static_Metadata_Descriptor in DRM InfoFrame to provide information on content color gamut to the sink device.

Referring to the diagram, according to an embodiment of the present invention, the DRM InfoFrame may include a static metadata descriptor ID field Static_Metadata_Descriptor ID and/or a static metadata descriptor Static_Metadata_ Descriptor. The static metadata descriptor may be described in Data Byte 3 to Data Byte n of the DRM InfoFrame. The static metadata descriptor ID field may identify the static metadata descriptor included in the DRM InfoFrame. A static metadata descriptor ID field value 0 may indicate that a static metadata descriptor is a static metadata descriptor corresponding to Static Metadata Type 1. A static metadata descriptor ID field value 1 to 7 may indicate a reserved value.

The static metadata descriptor corresponding to Static Metadata Type 1 may include a display_primaries field, a white_point field, a max_display_mastering_luminance field, a min_display_mastering_luminance field, a Maximum Content Light Level field, a Maximum Frame-average Light Level field, and/or a content color gamut field (CCG2, CCG1, and CCG0). A content color gamut field value "000" may indicate that the field is not used. That is, a content color gamut field value "000" may indicate that content color gamut is the same as container color gamut or there is no information on content color gamut. A content color gamut field value "001" may indicate that content color gamut is DCI-P3. Other values of the content color gamut field may indicate other colorimetry of content color gamut. The display_primaries field and the white_point field may indicate colorimetry values of a mastering display. The max_display_mastering_luminance field and the min_display_mastering_luminance field may indicate maximum/minimum luminance values of the mastering display. The Maximum Content Light Level field may indicate a maximum luminance value of content. The Maximum Frame-average Light Level field may indicate a maximum frame average luminance value.

Figure 33:
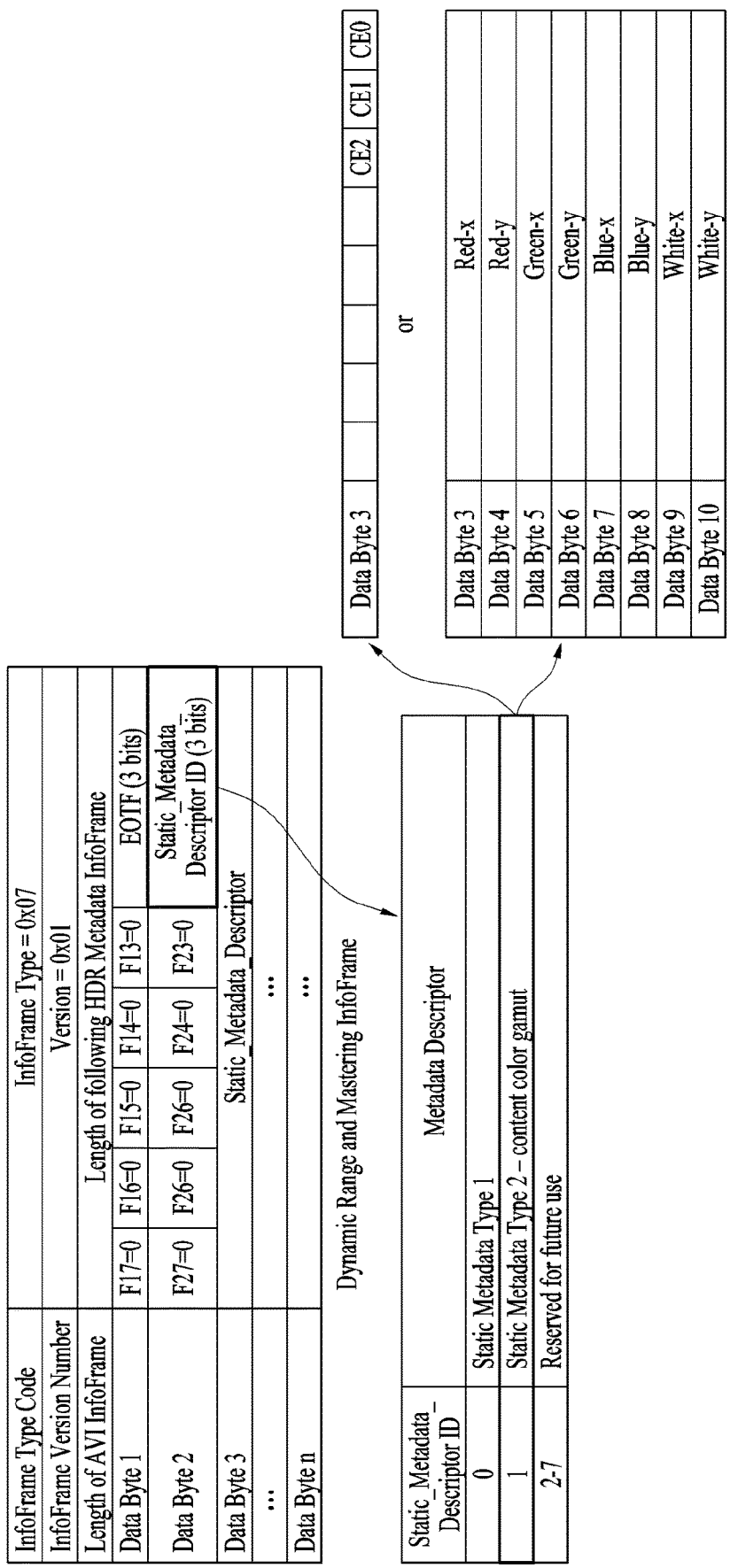
FIG. 33 is a diagram showing a method of signaling content color gamut to a sink device from a source device according to another embodiment of the present invention.

FIG. 33 is a diagram showing a method of signaling content color gamut to a sink device from a source device according to another embodiment of the present invention.

According to an embodiment of the present invention, a broadcast system may define a new static metadata type and define a content color gamut field and/or actual colorimetry values of content in a static metadata descriptor having the newly defined static metadata type. A content color gamut field and/or actual colorimetry values of content may be defined in the static metadata descriptor with a type.

Referring to the diagram, the DRM InfoFrame according to an embodiment of the present invention may include a static metadata descriptor ID field (Static_Metadata_Descriptor ID) and/or a static metadata descriptor (Static_Metadata_Descriptor). The static metadata descriptor may be described in Data Byte 3 to Data Byte n of DRM InfoFrame. The static metadata descriptor ID field may identify a static metadata descriptor included in the DRM InfoFrame. A static metadata descriptor ID field value 0 may indicate that the static metadata descriptor is a static metadata descriptor corresponding to Static Metadata Type 1. A static metadata descriptor ID field value 1 may indicate that the static metadata descriptor is a static metadata descriptor corresponding to Static Metadata Type 2. According to an embodiment of the present invention, a static metadata descriptor corresponding to Static Metadata Type 2 may include content color gamut and/or actual colorimetry values of content. Static metadata descriptor ID field values 2 to 7 may indicate reserved values.

The static metadata descriptor corresponding to Static Metadata Type 2 may include a content color gamut field (CCG2, CCG1, and CCG0) and/or a colorimetry value (Red-x, Red-y, Green-x, Green-y, Blue-x, Blue-y, and White-x, White-y) of content. A content color gamut field value "000" may indicate that the field is not used. That is, a content color gamut field value "000" may indicate that the content color gamut is the same as container color gamut or there is no information on content color gamut. A content color gamut field value "001" may indicate that content color gamut is DCI-P3. Other values of the content color gamut field may indicate other colorimetry of content color gamut. The aforementioned colorimetry value of content may indicate a position of Red, Green, Blue, and/or White color on color gamut represented by content.

FIG. 34 is a diagram showing a method of signaling information on content color gamut to a sink device from a source device according to an embodiment of the present invention.

According to an embodiment of the present invention, a broadcast system may signal content color gamut using a display_primaries field and a white_point field included in a static metadata descriptor corresponding to Static Metadata Type 1 of DRM InfoFrame.

According to an embodiment of the present invention, DRM InfoFrame may include a content color gamut flag field (CCG_flag), a static metadata descriptor ID field (Static_Metadata_Descriptor ID, SMD_ID), and/or a static metadata descriptor (Static_Metadata_Descriptor). The content color gamut flag field may indicate whether a display_primaries field and a white_point field included in a static metadata descriptor corresponding to Static Metadata Type 1 are used as colorimetry information indicating color gamut of content. When a value of the static metadata descriptor ID field is 0 and a value of the content color gamut flag field is 1, content color gamut may be signaled by a display_primaries field and a white_point field described in Data Byte 3 to 18 of DRM InfoFrame. That is, a content color gamut flag field value 1 may indicate that the display_primaries field and the white_point field indicate colorimetry information of content.

According to another embodiment of the present invention, when both the source device and the sink device know that the display_primaries field and the white_point field in DRM InfoFrame are used to describe content color gamut, the broadcast system may signal content color gamut using the display_primaries field and the white_point field without a content color gamut flag field.

Figure 35:
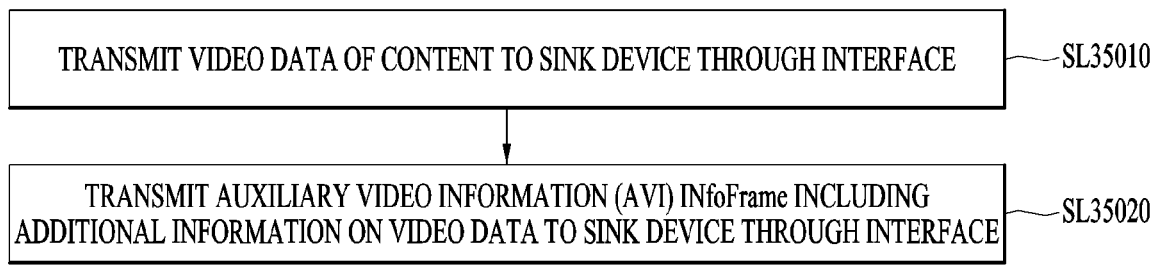
FIG. 35 is a diagram showing a video data processing method of a source device according to an embodiment of the present invention.

FIG. 35 is a diagram showing a video data processing method of a source device according to an embodiment of the present invention.

According to an embodiment of the present invention, the video data processing method of the source device may include transmitting video data of content to the sink device through an interface (SL35010) and/or transmitting auxiliary video information (AVI) InfoFrame including additional information on the video data to the sink device through the interface (SL35020). In this case, the AVI InfoFrame may include a colorimetry field indicating color gamut of the content, an extension colorimetry field indicating color gamut of the content along with the colorimetry field, and a container color gamut extension field indicating color gamut of a container for transmitting the content, the colorimetry field may include information indicating that the extension colorimetry field is effective, and the extension colorimetry field may include information indicating that the container color gamut extension field is effective.

According to another embodiment of the present invention, the video data processing method of the source device may further include receiving a colorimetry data block including information on color gamut supported by the sink device from the sink device through the interface and the colorimetry data block may include information indicating whether the sink device supports DCI-P3 color gamut.

According to another embodiment of the present invention, the video data processing method of the source device may further include transmitting dynamic range and mastering InfoFrame including information on a dynamic range of the video data to the sink device through the interface, the DRM InfoFrame may include a content color gamut field indicating color gamut of the content, and the content color gamut field may include information indicating that color gamut of the content is the same as color gamut of the container and information indicating that color gamut of the content is DCI-P3 color gamut.

According to another embodiment of the present invention, the video data processing method of the source device may further include receiving a HDR static metadata data block indicating high dynamic range (HDR) performance of the sink device to the sink device through the interface and the HDR static metadata data block may include information indicating whether the sink device requires information on color gamut of the content.

According to another embodiment of the present invention, the video data processing method of the source device may further include transmitting DRM InfoFrame including information on a dynamic range of the video data to the sink device through the interface, the DRM InfoFrame may include a static metadata descriptor and ID information for identifying the static metadata descriptor, and the static metadata descriptor may include at least one of a display colorimetry field indicating colorimetry information of a master display used for mastering processing of the content and a content color gamut field indicating color gamut of the content.

According to another embodiment of the present invention, the video data processing method of the source device may further include transmitting DRM InfoFrame including information on a dynamic range of the video data to the sink device through the interface, the DRM InfoFrame may include a static metadata descriptor and ID information for identifying the static metadata descriptor, and the static metadata descriptor may include at least one of a content color gamut field indicating color gamut of the content and an actual colorimetry value of the content.

According to another embodiment of the present invention, the DRM InfoFrame may include information indicating whether the display colorimetry field included in the static metadata descriptor is used to describe color gamut of the content.

Figure 36:
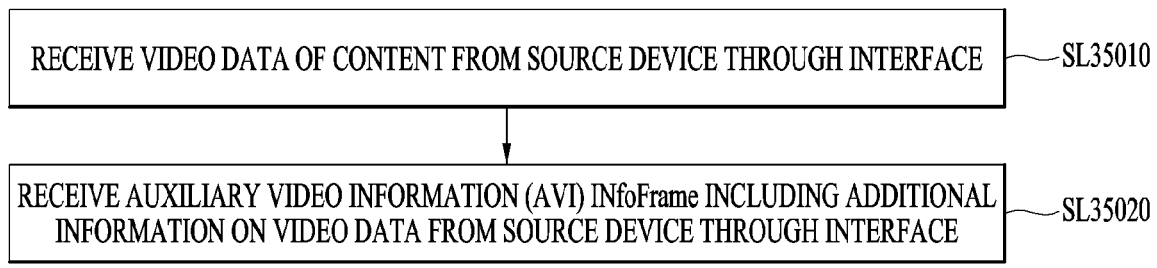
FIG. 36 is a diagram showing a video data processing method of a sink device according to an embodiment of the present invention.

FIG. 36 is a diagram showing a video data processing method of a sink device according to an embodiment of the present invention.

According to an embodiment of the present invention, the video data processing method of the sink device may include receiving video data of content from the source through an interface (SL36010) and/or receiving auxiliary video information (AVI) InfoFrame including additional information of the video data from the source device through the interface (SL36020). In this case, the AVI InfoFrame may include a colorimetry field indicating color gamut of the content, an extension colorimetry field indicating color gamut of the content along with the colorimetry field, and a container color gamut extension field indicating color gamut of a container for transmitting the content, the colorimetry field may include information that the extension colorimetry field is effective, and the extension colorimetry field indicating that the container color gamut extension field is effective.

According to another embodiment of the present invention, the video data processing method may further include transmitting a colorimetry data block including information on color gamut supported by the sink device to the sink device through the interface and the colorimetry data block may include information indicating whether the sink device supports DCI-P3 color gamut.

According to another embodiment of the present invention, the video data processing method may further include receiving dynamic range and mastering (DRM) InfoFrame including information on a dynamic range of the video data to the source device through the interface, the DRM InfoFrame may include a content color gamut field indicating color gamut of the content, and the content color gamut field may include information indicating that color gamut of the content is the same as color gamut of the container and information indicating that color gamut of the content is DCI-P3 color gamut.

According to another embodiment of the present invention, the video data processing method may further include transmitting a HDR static metadata data block indicating high dynamic range (HDR) performance of the sink device to the source device through the interface and the HDR static metadata data block may include information indicating whether the sink device requires information on color gamut of the content.

According to another embodiment of the present invention, the video data processing method may further include receiving DRM InfoFrame including information on a dynamic range of the video data from the source device through the interface, the DRM InfoFrame may include a static metadata descriptor and ID information for identifying the static metadata descriptor, and the static metadata descriptor may include at least one of a display colorimetry field indicating colorimetry information of a mastering display used for mastering processing of the content and a content color gamut field indicating color gamut of the content.

According to another embodiment of the present invention, the video data processing method may further include receiving DRM InfoFrame including information on a dynamic range of the video data from the source device through the interface, the DRM InfoFrame may include a static metadata descriptor and ID information for identifying the static metadata descriptor, and the static metadata descriptor may include at least one of a content color gamut field indicating color gamut of the content and an actual colorimetry value of the content.

Figure 37:
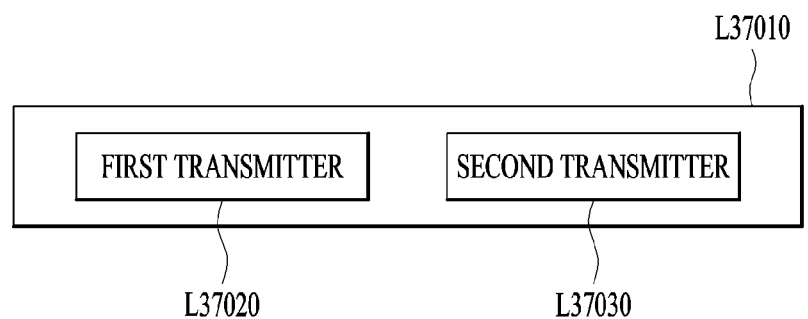
FIG. 37 is a diagram showing a structure of a video data processing apparatus (source device) according to an embodiment of the present invention.

FIG. 37 is a diagram showing a structure of a video data processing apparatus (source device) according to an embodiment of the present invention.

According to an embodiment of the present invention, a video data processing apparatus (source device) L37010 may include a first transmitter L37020 for transmitting video data of content to the sink device through an interface and/or a second transmitter L37030 for transmitting auxiliary video information (AVI) InfoFrame including additional information of the video data to the skin device through the interface. In this case, the AVI InfoFrame may include a colorimetry field indicating color gamut of the content, an extension colorimetry field indicating color gamut of the content along with the colorimetry field, and a container color gamut extension field indicating color gamut of a container for transmitting the content, the colorimetry field may include information indicating that the extension colorimetry field is effective, and the extension colorimetry field may include information indicating the container color gamut extension field is effective.

Figure 38:
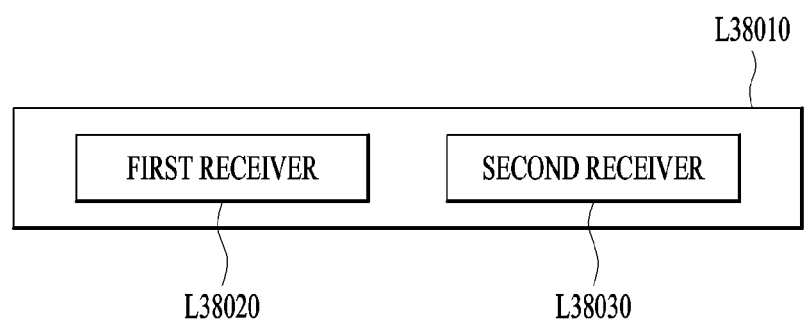
FIG. 38 is a diagram illustrating a structure of a video data processing apparatus (sink device) according to an embodiment of the present invention.

FIG. 38 is a diagram illustrating a structure of a video data processing apparatus (sink device) according to an embodiment of the present invention.

According to an embodiment of the present invention, a video data processing apparatus (sink device) L38010 may include a first receiver L38020 for receiving video data of content from the source device through an interface and/or a second receiver L38030 for receiving auxiliary video information (AVI) InfoFrame including additional information of the video data from the source device through the interface. In this case, the AVI InfoFrame may include a colorimetry field indicating color gamut of the content, an extension colorimetry field indicating color gamut of the content along with the colorimetry field, and a container color gamut extension field indicating color gamut of a container for transmitting the content, the colorimetry field may include information indicating that the extension colorimetry field is effective, and the extension colorimetry field may include information indicating that the container color gamut extension field is effective.

Modules or units may be processors executing consecutive processes stored in a memory (or a storage unit). The steps described in the aforementioned embodiments can be performed by hardware/processors. Modules/blocks/units described in the above embodiments can operate as hardware/processors. The methods proposed by the present invention can be executed as code. Such code can be written on a processor-readable storage medium and thus can be read by a processor provided by an apparatus.

While the embodiments have been described with reference to respective drawings for convenience, embodiments may be combined to implement a new embodiment. In addition, designing computer-readable recording media storing programs for implementing the aforementioned embodiments is within the scope of the present invention.

The apparatus and method according to the present invention are not limited to the configurations and methods of the above-described embodiments and all or some of the embodiments may be selectively combined to obtain various modifications.

The methods proposed by the present invention may be implemented as processor-readable code stored in a processor-readable recording medium included in a network device. The processor-readable recording medium includes all kinds of recording media storing data readable by a processor. Examples of the processor-readable recording medium include a ROM, a RAM, a CD-ROM, a magnetic tape, a floppy disk, an optical data storage device and the like, and implementation as carrier waves such as transmission over the Internet. In addition, the processor-readable recording medium may be distributed to computer systems connected through a network, stored and executed as code readable in a distributed manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Both apparatus and method inventions are mentioned in this specification and descriptions of both the apparatus and method inventions may be complementarily applied to each other.

Those skilled in the art will appreciate that the present invention may be carried out in other specific ways than those set forth herein without departing from the spirit and essential characteristics of the present invention. Therefore, the scope of the invention should be determined by the appended claims and their legal equivalents, not by the above description, and all changes coming within the meaning and equivalency range of the appended claims are intended to be embraced therein.

In the specification, both the apparatus invention and the method invention are mentioned and description of both the apparatus invention and the method invention can be applied complementarily.

MODE FOR INVENTION

Various embodiments have been described in the best mode for carrying out the invention.

INDUSTRIAL APPLICABILITY

The present invention is applied to broadcast signal providing fields.

Various equivalent modifications are possible within the spirit and scope of the present invention, as those skilled in the relevant art will recognize and appreciate. Accordingly, it is intended that the present invention cover the modifications and variations of this invention provided they come within the scope of the appended claims and their equivalents.

The invention claimed is:

1. A video data processing method comprising:
    transmitting video data to a sink device through an interface; and
    transmitting auxiliary video information (AVI) InfoFrame comprising additional information on the video data to the sink device through the interface,
    wherein the AVI InfoFrame comprises a first colorimetry field in data byte 2, a second colorimetry field in data byte 3, and a third colorimetry field in data byte 14,
    wherein the first colorimetry field indicates a first color gamut of the video data or indicates that the second colorimetry field is valid,
    wherein the second colorimetry field indicates a second color gamut of the video data or indicates that the third colorimetry field is valid,
    wherein the third colorimetry field indicates a third color gamut of the video data,
    wherein a color gamut of the video data is indicated by using the first colorimetry field in conjunction with the second colorimetry field and the third colorimetry field, and
    wherein the color gamut of the video data is set to the third color gamut indicated by the third colorimetry field in response to the first colorimetry field indicating that the second colorimetry field is valid and the second colorimetry field indicating that the third colorimetry field is valid.

2. The method according to claim 1, further comprising receiving a colorimetry data block comprising information on a color gamut supported by the sink device from the sink device through the interface,
    wherein the colorimetry data block comprises information for indicating whether the sink device supports a DCI-P3 color gamut.

3. The method according to claim 1,
    wherein the DRM InfoFrame comprises a content color gamut field indicating the color gamut of the content; and
    wherein the first colorimetry field indicates that the second colorimetry field is valid when a value of the first colorimetry field is '11', and
    wherein the second colorimetry field indicates that the third colorimetry field is valid when a value of the second colorimetry field is '111'.

4. The method according to claim 1, further comprising receiving a high dynamic range (HDR) static metadata data block for indicating HDR performance of the sink device from the sink device through the interface.

5. The method according to claim 1, further comprising transmitting dynamic range and mastering (DRM) InfoFrame comprising information on a dynamic range of the video data to the sink device through the interface,
    wherein the DRM InfoFrame comprises a static metadata descriptor and ID information for identifying the static metadata descriptor and
    wherein the static metadata descriptor comprises a display colorimetry field for indicating colorimetry information of a mastering display used for mastering processing of the video data.

6. A video data processing method comprising:
    receiving video data from a source device through an interface; and
    receiving auxiliary video information (AVI) InfoFrame comprising additional information on the video data from the source device through the interface,
    wherein the AVI InfoFrame comprises a first colorimetry field in data byte 2, a second colorimetry field in data byte 3, and a third colorimetry field in data byte 14,
    wherein the first colorimetry field indicates a first color gamut of the video data or indicates that the second colorimetry field is valid,
    wherein the second colorimetry field indicates a second color gamut of the video data or indicates that the third colorimetry field is valid,
    wherein the third colorimetry field indicates a third color gamut of the video data,
    wherein a color gamut of the video data is indicated by using the first colorimetry field in conjunction with the second colorimetry field and the third colorimetry field, and
    wherein the color gamut of the video data is set to the third color gamut indicated by the third colorimetry field in response to the first colorimetry field indicating that the second colorimetry field is valid and the second colorimetry field indicating that the third colorimetry field is valid.

7. The method according to claim 6, further comprising transmitting a colorimetry data block comprising information on a color gamut supported by the sink device to the source device through the interface,
    wherein the colorimetry data block comprises information for indicating whether the sink device supports a DCI-P3 color gamut.

8. The method according to claim 6,
wherein the first colorimetry field indicates that the second colorimetry field is valid when a value of the first colorimetry field is '11' and
wherein the second colorimetry field indicates that the third colorimetry field is valid when a value of the second colorimetry field is '111'.

9. The method according to claim 6, further comprising transmitting a high dynamic range (HDR) static metadata data block for indicating HDR performance of the sink device to the source device through the interface.

10. The method according to claim 6, further comprising receiving dynamic range and mastering (DRM) InfoFrame comprising information on a dynamic range of the video data from the source device through the interface,
wherein the DRM InfoFrame comprises a static metadata descriptor and ID information for identifying the static metadata descriptor and
wherein the static metadata descriptor comprises a display colorimetry field indicating colorimetry information of a mastering display used for mastering processing of the video data.

11. A video processing apparatus comprising:
a first transmitter configured to transmit video data to a sink device through an interface; and
a second transmitter configured to transmit auxiliary video information (AVI) InfoFrame comprising additional information on the video data to the sink device through the interface,
wherein the AVI InfoFrame comprises a first colorimetry field in data byte 2, a second colorimetry field in data byte 3, and a third colorimetry field in data byte 14,
wherein the first colorimetry field indicates a first color gamut of the video data or indicates that the second colorimetry field is valid,
wherein the second colorimetry field indicates a second color gamut of the video data or indicates that the third colorimetry field is valid,
wherein the third colorimetry field indicates a third color gamut of the video data,
wherein a color gamut of the video data is indicated by using the first colorimetry field in conjunction with the second colorimetry field and the third colorimetry field, and
wherein the color gamut of the video data is set to the third color gamut indicated by the third colorimetry field in response to the first colorimetry field indicating that the second colorimetry field is valid and the second colorimetry field indicating that the third colorimetry field is valid.

12. A video processing apparatus comprising:
a first receiver configured to receive video data from a source device through an interface; and
a second receiver configured to receive auxiliary video information (AVI) InfoFrame comprising additional information on the video data from the source device through the interface,
wherein the AVI InfoFrame comprises a first colorimetry field in data byte 2, a second colorimetry field in data byte 3, and a third colorimetry field in data byte 14,
wherein the first colorimetry field indicates a first color gamut of the video data or indicates that the second colorimetry field is valid,
wherein the second colorimetry field indicates a second color gamut of the video data or indicates that the third colorimetry field is valid,
wherein the third colorimetry field indicates a third color gamut of the video data,
wherein a color gamut of the video data is indicated by using the first colorimetry field in conjunction with the second colorimetry field and the third colorimetry field, and
wherein the color gamut of the video data is set to the third color gamut indicated by the third colorimetry field in response to the first colorimetry field indicating that the second colorimetry field is valid and the second colorimetry field indicating that the third colorimetry field is valid.

13. The video processing apparatus according to claim 11,
wherein the second transmitter receives a colorimetry data block comprising information on a color gamut supported by the sink device from the sink device through the interface and wherein the colorimetry data block comprises information for indicating whether the sink device supports a DCI-P3 color gamut.

14. The video processing apparatus according to claim 11,
wherein the first colorimetry field indicates that the second colorimetry field is valid when a value of the first colorimetry field is '11' and
wherein the second colorimetry field indicates that the third colorimetry field is valid when a value of the second colorimetry field is '111'.

15. The video processing apparatus according to claim 12,
wherein the second receiver transmits a colorimetry data block comprising information on a color gamut supported by the sink device to the source device through the interface and
wherein the colorimetry data block comprises information for indicating whether the sink device supports a DCI-P3 color gamut.

16. The video processing apparatus according to claim 12,
wherein the first colorimetry field indicates that the second colorimetry field is valid when a value of the first colorimetry field is '11' and
wherein the second colorimetry field indicates that the third colorimetry field is valid when a value of the second colorimetry field is '111'.

* * * * *